United States Patent
Kalyan et al.

(10) Patent No.: US 6,826,538 B1
(45) Date of Patent: Nov. 30, 2004

(54) METHOD FOR PLANNING KEY COMPONENT PURCHASES TO OPTIMIZE REVENUE

(75) Inventors: Vibhu K. Kalyan, Plano, TX (US); Vikas Singh, Irving, TX (US); Jeffrey H. Starr, Carrollton, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/362,776

(22) Filed: Jul. 28, 1999

(51) Int. Cl.[7] ............................................... G06F 17/60
(52) U.S. Cl. .............................. 705/7; 705/8; 705/400
(58) Field of Search ........................... 700/90, 99, 106; 705/7, 8, 400

(56) References Cited

U.S. PATENT DOCUMENTS

| | | | |
|---|---|---|---|
| 5,630,070 A | 5/1997 | Dietrich et al. | ............. 395/208 |
| 5,971,585 A | 10/1999 | Dangat et al. | ......... 364/468.08 |

FOREIGN PATENT DOCUMENTS

| | | | |
|---|---|---|---|
| JP | 06-251175 | * | 9/1994 |
| JP | 11-224247 | * | 8/1999 |

OTHER PUBLICATIONS

N. Economides, et al., "Competition and integration among complements, and network market structure" (Symposium on Compatibility), Journal of Industrial Economics, v40, n1, p105(19).

International Preliminary Examining Authority, Written Opinion, 6 pages.

* cited by examiner

*Primary Examiner*—John G. Weiss
*Assistant Examiner*—Jonathan Ouellete
(74) *Attorney, Agent, or Firm*—Baker Botts L.L.P.

(57) ABSTRACT

A method of calculating supplies of key components based on enhancing revenues in a made to order scheme. Products are designed by identifying product components, and combining the components in various combinations. Key component supplies are calculated using an algorithm that considers demand probability of component and product as well as calculating the marginal value of each component.

30 Claims, 5 Drawing Sheets

METHOD FOR PLANNING KEY COMPONENT PURCHASES TO OPTIMIZE REVENUE

TECHNICAL FIELD OF THE INVENTION

This invention relates to computer-implemented enterprise management tools, and more particularly to a method for revenue optimization in a make to order material planning problem.

BACKGROUND OF THE INVENTION

High-tech manufacturers, including computer makers, assemble components procured from various suppliers into various computer configurations demanded by their customers. In the past, most of them would sell pre-configured personal computers (PCs) to their reveler channels (Best Buy, CompUSA etc.) with limited configuration capability at the point of contact with the customer (a 233 Mhz PC cannot be changed to a 400 Mhz on demand, for instance). While the examples used refer to PCs the invention disclosed is not limited to PCs but also other families of higher performance systems too unless otherwise stated or clear from the context.

In a Make-To-Order (MTO) situation, no assembly takes place without a specific customer order. Many manufacturers are moving to a MTO business model. Parts are ordered from the supplier when needed and they have contracts to have them delivered within hours of a request. Different types of relationships exist with different suppliers. For microprocessors, a longer lead time may be needed. In any case, in spite of this quick response relationship with suppliers that PC manufacturers (PCM) have, there is a need for planning some key components (KC) in advance. Obviously there are lead time requirements that suppliers have unless the suppliers want to take the risk have plenty of key components in stock. But then, the risk simply shifts to the suppliers and does not lead to a stable relationship. Personal computer manufacturers or similar manufacturers (in this document only the MTO type of manufacturing are being considered and would be assumed as a default instead of having to emphasize each time) also plan for these key components so as to negotiate the quantities needed for supplies over a period of time (say a quarter) with their suppliers in advance. In addition this planning also serves other internal business units (financials etc.). However, the actual delivery may still be Just In Time (JIT) from the supplier and the actual manufacturing will still be MTO. A typical supplier contract may be an agreement to purchase a certain quantity, Q, of a component over a time period, T. During T, the PCM may be above or may be below Q without penalty. That is, so long as the actual purchased quantity is within a negotiated band around Q, the PCM pays only for the actual purchase at the negotiated per unit price. Outside these bands there could be penalties for over or under purchase. On the upside however, over purchase cannot exceed some limit. The penalty for over purchase is a measure of the expediting cost. Also there is a lead time to inform the suppliers of the intention to buy components to help them plan for their next quarter component needs. Although not optimal, many PCM's use First Come First Serve (FCFS) model to dispense their product. This part of the business is known as the execution or product control policy (PCP). FCFS means, if an order comes in and there are parts to make it (available or can be expedited within negotiated limits with suppliers), then the order will be satisfied whether economically it makes sense or not. What is needed is a model that can predict the optimal amounts of key components to purchase in a multi-platform system.

SUMMARY OF THE INVENTION

A method of calculating supplies of key components based on enhancing revenues in a made to order scheme is provided. Products are designed by identifying product components, and combining the components in various combinations. Key component supplies are calculated using an algorithm that considers demand probability of component and product as well as calculating the marginal value of each component in an iterative scheme.

An advantage of the invention is that it provides a method of determining the supply of key components in a make to order situation. Other advantages will be readily apparent to those skilled in the art from the following drawings, descriptions and claims.

DETAILED DESCRIPTION OF THE DRAWINGS

Figure 1:
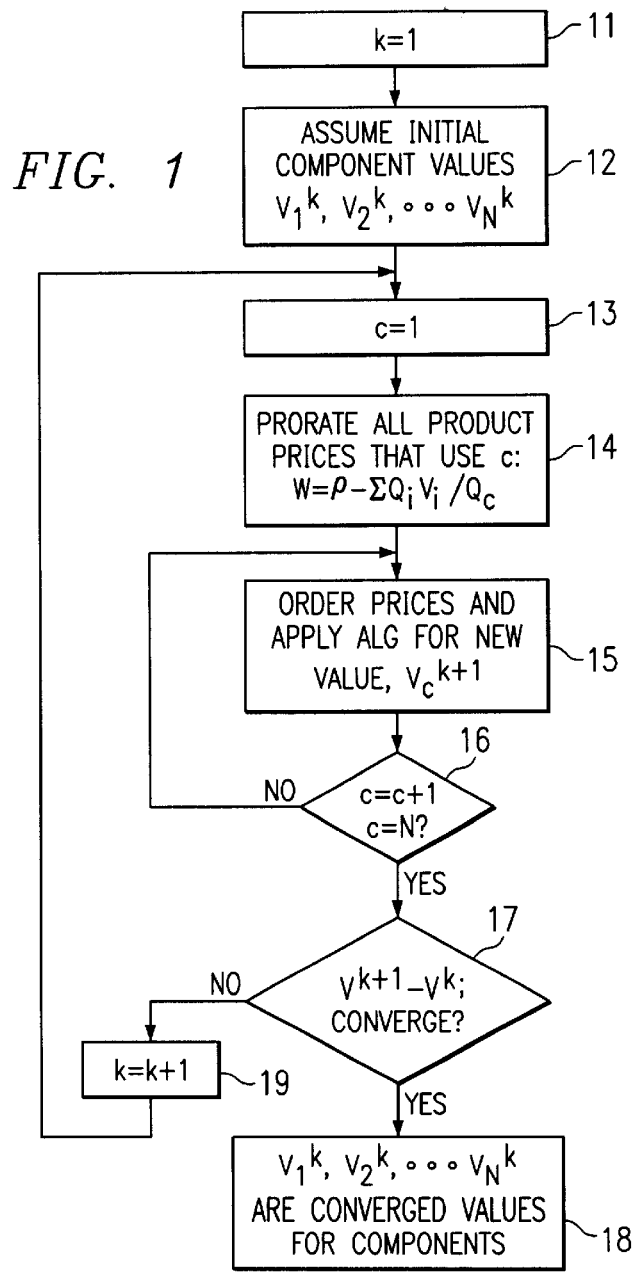
FIG. 1 illustrates a method of pricing products in terms of their components, using probabilistic demand calculations in accordance with the invention.

The following description is directed to a computer-implemented tool that implements a "value management" (VM) pricing method. This pricing tool is a synthesis of two other computer-implemented business management tools: yield management practice, such as is used by airlines to price tickets, and tools for decision support across supply chains, such as are commercially available from i2 Technologies Inc. The present invention is a novel combination of these two software applications, and can be beneficial in a number of areas, such as pricing, product design and product control. In general, the invention can be implemented as program code and data, which are executed on a computer system and provide results to a user both as stored and displayed data.

Value Management for Product Pricing

Value management may be used as a pricing solution that balances supply with demand. As explained below, the prices of components that make up a product are determined based on probabilistic demand and available supply. More specifically, using statistical forecasts for standard products (SP) that consume known amounts of some underlying materials, called critical components (CC), together with known prices for the SPs, the values of the CC's are calculated based on their available supply at the time of the calculation. The CC values are calculated using an iterative process.

For purposes of this description, the following parameters are defined:

N number of different CC's that are used in building various products $A_h$ the amount available of the $h^{th}$ component=h1, 2, . . . N M number of standard products being offered for sale $P_k$ the offered price for the $k^{th}$ product, k=1, 2, . . . M $F_k(x)$ cumulative density function (CDF) for the $k^{th}$ product $S_k$ ordered set of components used to build the $k^{th}$ product, referred to herein as the component set (CS)

$Q_{rk}$ consume per of $r^{th}$ component in $S_k$, r=1, 2, . . . $C_k$, referred to herein as the component usage set (CUS)

The pricing problem assumes a limited availability of CC's, and a number of non-standard products (NSPs) that can be built using varying amounts and combinations of CC's along with SP's. The task is how to determine values for non-SPs, which are not predefined, unlike SPs whose prices are known as part of the inputs? Also, should any order for a product (SP or NSP) be satisfied so long as there are the resources (CC's) to make it? In other words, is the pricing policy to be first-come first-serve (FCFS) for any product order? Or is control to be exercised, whereby an order may be accepted or rejected based on some criteria?

A distinction is made between price and value. Price of a SP is an input that serves as a starting amount that the customer is willing to pay for the product and has an associated probability distribution that specifies the probability of various levels of unconstrained demands (irrespective of availability of CC's or any constraining factor). Value on the other hand is the customer's willingness to pay for a product balanced with the supply of the product. For purpose of this description, the difference is that "value" is computed by explicitly applying the supply and demand law on the inputs that consist of, in addition to others, available supply and demand, while "price" is used as an independent variable to determine value. At times the two terms may be used interchangeably, but the context should make clear which meaning is in force. "Price" is also used in the context of the price that is asked of a customer, which need not be the computed value. Rather, value serves as a reference that can be used for price negotiation.

Determining values for all possible combinations of CCs would be a difficult and intractable problem. Instead the pricing method focuses on individual CC's and determines their values. As explained below, to determine the value of any product, it is first determined what CC's the product consumes and the amount consumed per unit (consume_per). Then the values of the CCs consumed are calculated and added to arrive at a value for the product. The problem is thereby reduced to that of determining the values for the CC's.

Optimal prices for components are a function of controlling the sale of the product. FCFS is one type of control (or no-control). Another control is setting explicit allocations for various products, but this may be impractical when there are a large number of products and not all of them are predefined. The following control strategy is suitable for use with the present invention. If $V_i$ is the value of $i^{th}$ component, then:

$$MAV^p = \sum_{i \in S^p} Q_i^p V_{ith}$$

, where $S^p$ is the set of components used by product p (not necessarily a standard product), $MAV^p$ is the minimum acceptable value for product p, and $Q_i^p$ is the consume_per value for product p for component i. An alternative to a FCFS policy is a control policy that permits a product p to be sold if its price is greater than $MAV^P$. This control policy is referred to herein as MAV control (MAVC).

Assuming a MAVC pricing control policy, the pricing problem may be solved as an optimization problem, in which the task is to maximize the total expected revenue, R(V, A), to come at time t, where:

V=($V_1$, $V_2$, . . . $V_N$)=vector of component values at time t

A=($A_1$, $A_2$, . . . $A_N$)=vector of available supply of components at time t P=($P_1$, $P_2$, . . . $P_M$)=vector of SPs with prices at time t F=($F_1(x)$, $F_2(x)$, . . . $F_M(x)$)=vector of CDF's for each of the M products, where x=0, 1, 2, . . . , and represents demand-to-come at time t S={$S_1$, $S_2$, □$S_M$}=ordered set of components, CS, for each SP, where $S_k$={$L_1$, $L_2$, . . . $L_{i(k)}$}, $L_1 < L_2$ . . . $< L_{i(k)}$ Q=CUS={$Q_{L1k}$, $Q_{L2k}$, $Q_{Li(k)k}$}

If solved in its most general form, the pricing problem is nonlinear and complex. Even without introducing the time variable t, it is difficult. It has a discrete variable, x, and a continuous variable, V, making it a mixed integer non linear program.

The pricing problem can be simplified by making several assumptions: assume x is continuous, an assumption that is good for large values of x; drop the dependence on t, solve a static problem at a given value of t, and model the effect of varying t by repeatedly revising the solution in real time; when possible model $F_k(x)$ as a known distribution, for example, a normal distribution. The latter assumption allows specification of the demand distribution by only a few parameters. For a normal distribution, the assumption permits distribution to be specified as the mean and the standard deviation of each demand. If needed, a truncated form of the distribution can be used to disallow negative values.

FIG. 1 illustrates the steps of a heuristic method that provides optimal values of component prices, V. Step 11 is initializing an increment counter value, k. Step 12 is assuming a set of, beginning values for the components. Step 13 is selecting a first component, such that c=1.

Step 14 involves calculating a value, w, that represents the prorated value of a product on a component. Given a price p for a standard product, a vector V of component values, and its CS given by S, its prorated value, w, on a component c (belongs to its CUS), is as described by Equation (1):

$$w = \left( p - \sum_{i \in S, i \neq c} Q_i V_i \right) / Q_c \quad (1)$$

, where $Q_c$ is consume_per for the product for component c.

A property of this proration is that if for converged values of V, w is greater than $V_c$, then it follows that:

$$p > \sum_{i \in s} V_i$$

, which is equivalent to p being an acceptable price.

An interpretation of Equation (1) is that the value the product brings for component c is its price minus the value displaced from all the other components it uses. Dividing the displaced revenue by the consume_per for c gives the value per unit of component.

Step 15 is calculating a new component value, given known prices of products and their associated demand probability distributions. Typically, the "known" prices are those of standard products that use the component. For the description of the process, the calculation of Step 15 to be use a process referred to herein as ALG are assumed.

The ALG process is described herein by example. Three products and two critical components are assumed.

| Product Price | Forecast | Component Set | Component Usage Set |
|---|---|---|---|
| P1 | Prob. {demand = 1} = p1 | {1, 2} | {1, 1} |
| P2 | Prob. {demand = 1} = p2 | {1} | {1} |
| P3 | Prob. {demand = 1} = p3 | {2} | {1} |

The available supply of each component is 1. O12 is the probability that demand for product 1 (price P1) arrives before that of product 2. O21 is the probability that demand for product 2 arrives befre that for product 1, or O21=1−O12. Similarly, O13 is the probability that demand for product 1 arrives before that of product 3. It is assumed these probabilities can be computed as:

$O12 = p1/(p1+p2)$ $O21 = p2/(p1+p2)$ $O13 = p1/(p1+p3)$ $O23 = p2/(p1+p3)$

As explained below, the component value calculations use values representing both the probability that demand will materialize, i.e., p1, p2, p3, and the probability that demand will arrive in a certain order, i.e., O12, O21, O13, O23.

Where the two component values are V1 and V2, the initial estimate of component values is V11 and V21. Set k and r to 1.

Prorated values on component 1 from each product using it are calculated as:

Product Prorated on Component 1

| Product | Prorated on Component 1 |
|---|---|
| 1 | P11 = P1 − V2r |
| 2 | P2 |

The component 1 value is computed by letting MV1= p*MAX(P11, P2), where p=p1 or p2 depending on whether the first or the second term is maximum, respectively. Then, $MV2 = O12(p1*P11+(1-p1)*p2*P2) + O12*(p2*P2+(1-p2)*p1*P11)$ The new value for component 1 is:

$V1k = \text{MAX}(MV1, MV2)$

Prorated values on component 2 are calculated as:

| Product | Prorated on Component 2 |
|---|---|
| 1 | P12 = P1 − V1k |
| 3 | P3 |

The method moves to a next component, if any, at step 16. If there is a next component, the method returns to step 15 to calculate a new component value for the next component. The component 2 value is computed by letting MV1=p*MAX(P12, P3), where p=p1 or p3 depending on whether the first or the second term is maximum, respectively. Then, $MV2 = O21(p1*P12+(1-p1)*p3*P3) + O22*(p3*P3+(1-p3)*p1*P11)$ The new value for component 2 is:

$V2r = \text{MAX}(MV1, MV2)$

If there is no next component at step 16, the method proceeds to step 17. If V1k and V2r have converged at step 17, the ALG process is ended at step 18 with converged values for the components. Otherwise, the proration and ALG steps are repeated by incrementing k and r at step 19, and returning to step 13 to select another component. The converged values are the "values", or the prices for the two components.

The following table illustrates the results (component values V1 and V2) of the calculations above for various input values (P1 and P2 prices and demand probabilities). Due to a convergence criterion of 0.5, the values have a precision of ±0.5.

| P1 ($) | p1 | P2 ($) | p2 | P3 ($) | p3 | V1 ($) | V2 ($) |
|---|---|---|---|---|---|---|---|
| 2500 | .5 | 1500 | .5 | 1500 | .5 | 1090.9 | 1090.9 |
| 2500 | .9 | 1500 | .5 | 1500 | .5 | 1244.8 | 1244 |
| 2500 | .5 | 1500 | .8 | 1500 | .5 | 1351.8 | 993.09 |
| 2500 | .5 | 1500 | .5 | 1500 | .8 | 993.1 | 1351.8 |
| 2500 | .5 | 2000 | .5 | 1500 | .5 | 1309 | 1009.1 |
| 2500 | .5 | 1500 | .5 | 2000 | .5 | 1009 | 1309.1 |

These component values represent values for a given time horizon, i.e., one day, for which demand distributions and other inputs are specified.

Figure 2A:
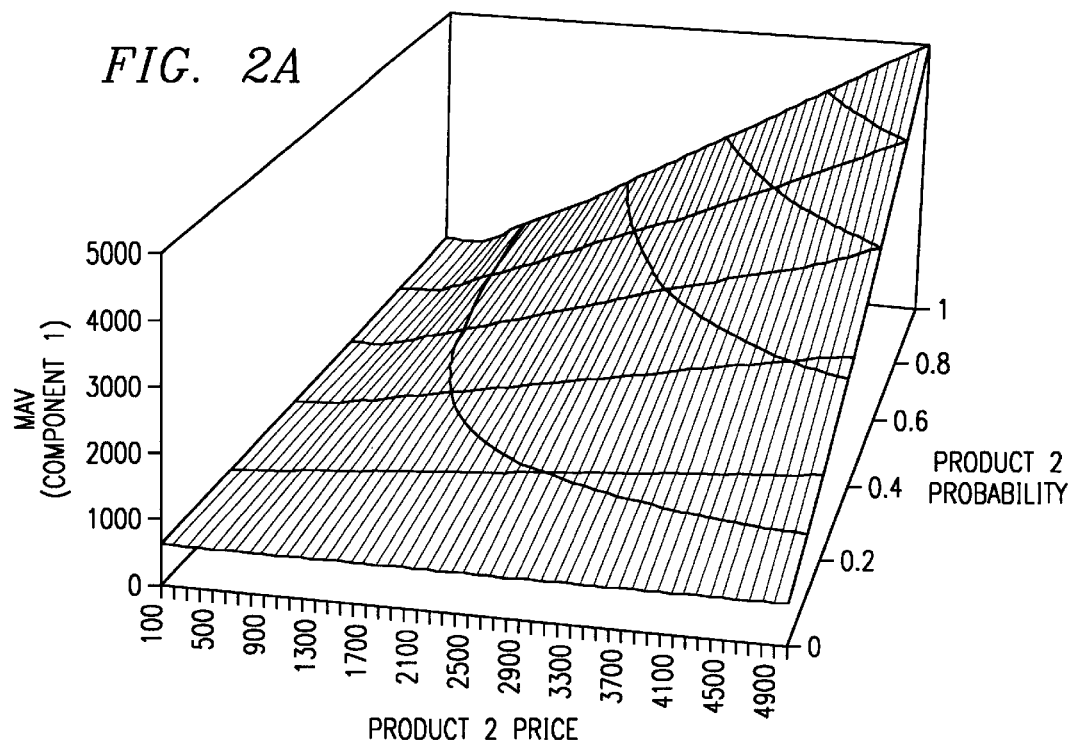
FIGS. 2A and 2B illustrate how component values, product prices, and product demand probabilities can be graphically represented in three dimensions.
Figure 2B:
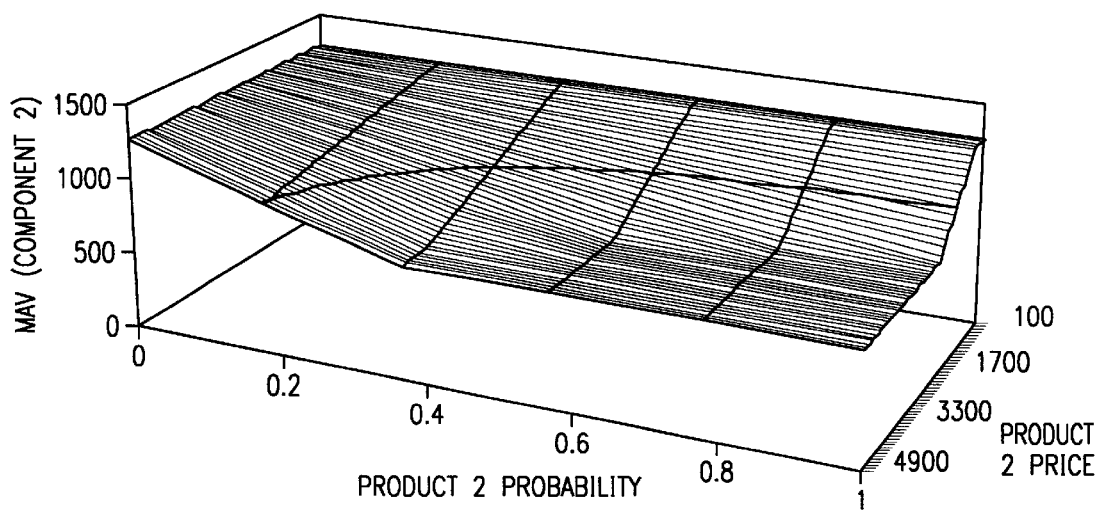

FIGS. 2A and 2B illustrate how component values, product prices, and product demand probabilities can be graphically represented in three dimensions. A component values is identified as a MAV (minimum acceptable value) as calculated above. FIG. 2A illustrates the MAV for component 1 and the price and demand probability for product 2; FIG. 2B illustrates the data for component 2.

For purposes of the method of FIG. 1, demand distributions can be modeled as normal, Poisson or binary or some known distribution, which require only a limited number of parameters. For normal, only mean and standard deviation is required. The pricing calculations can be modified to accommodate various distributions.

For the inputs to the process, some pricing information, such as an elasticity curve, is needed. These input prices are for SPs only, and may be prices that a business is already comfortable with or obtained from price-demand curves. As explained above, these prices are used to arrive at component values, which in turn can be used to price NSPs based on supply and demand. The component values represent a mapping of forecasted SP demand (with uncertainty) and SP prices onto a limited supply of components. In fact, if SPs were repriced based on these component values, the result would be a lower value since the average revenue for a probabilistic demand for a fixed price is less than the price. However, when selling an NSP, it should be determined how much revenue is being displaced that could have been made at the SP prices and probabilistic demand. Also, when using the component values to negotiate prices, the pricing process may consider factors such as competitive prices and costs.

Calculated component values can be the basis of a variety of pricing decisions. For example, a component that has a 0 component value indicates an oversupply of the component or a lack of demand—two sides of the same coin since oversupply is with respect to demand only. If all components have 0 component values that means there are no critical components. But this does not imply a selling price of $0. This situation also suggests potential oversupply or lack of demand. If it is known that a new product is going to be introduced that will adversely affect the current line of products, the affected component values may drop to a very low value, indicating that the current line should be quickly unloaded.

The above-described component value calculation provides a minimum acceptable value (MAV) for a component, which differs for different production days. An enhanced process can implemented to take all component values as inputs across a time horizon and perform a smoothing operation, to obtain uniform component values for each component across the time horizon. The physical meaning of this operation is that material supply is moved forward in time. Each component then has the same MAV for all future time horizons. As a by product of this step, it is conceivable that this inventory movement could be used to adjust the supply alignment with the suppliers, given enough lead time. Assume a manufacturer has a certain supply arrangement of materials for each day over the next several days. After calculating component values, a new arrangement can be designed, optimized with respect to supply and demand. The plan may be changed repeatedly, as often as the calculation of component values is carried out.

The process described above to calculate pricing for a three-product two-component case can be generalized to include more complex situations. Examples of complexities are: inclusion of available supplies of components to be greater than 1; more complex continuous probability distributions for demand of products; consume_per of components greater than 1; multiple time horizons, where component values that differ over various time horizons will are smoothed so only one value is seen over all horizons; generalization to volume orders (similar to group bookings for airlines); and inclusion of demand and/or price curves for products instead of a static value.

Figure 3:
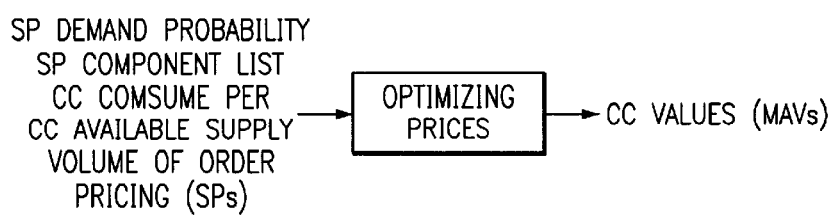
FIG. 3 represents the pricing process in terms of its inputs and outputs.

FIG. 3 illustrates the pricing process in terms of its inputs and outputs. The inputs are: unconstrained demand distribution of each SP for each time horizon of interest, price offered for each SP, component list for each SP, the consume_per of each component for each SP, the available supply of each critical component for each time horizon of interest, volume of order, pricing and demand curves as a function of time (if known). The outputs are: value for each critical component for each time horizon, and optionally, a smoothed value for each critical component over all time horizons of interest.

Value Management for Lead Time Pricing

The above-described value management (VM) pricing process can be extended to determine pricing based on varying lead time requirements of the customer. An environment in which lead time pricing might operate is one in which a manufacturer is negotiating a price with a customer. For example, the manufacturer might be attempting land an order of, say 50,000 personal computers (PC□s). The customer typically wants various options, configurations and each option or configuration in specific quantities delivered over a specified time period. The customer does not want the complete order delivered at the same time. Rather, it wants the flexibility to call anytime during the specified time period to draw against this bulk order, each time the quantity requested not exceeding an agreed upon number, Q. But once the order is placed, the delivery should occur within LT weeks.

Given these conditions and given the capacity to fill the order, lead time pricing method determines answers to the following issues: What price to quote to the customer for each option (each option is a particular type of PC requiring certain components to build it) based on Q? How does this price vary as a function of LT? What is the maximum frequency of customer orders that should be negotiated? Is there an economic value that can be assigned to this frequency?

The lead time pricing method focuses on the value of the constrained resource (materials) based on the projection of future sales of SPs that can be made from the materials, the advertised prices for the SPs, and the available supply of materials. In the method described above in connection with FIG. 1, it was shown how, given an available supply of constrained materials, and probabilistic demand of SPs and their prices, the values of the critical components can be computed.

The component values (MAVs) calculated in accordance with FIG. 1 are marginal values, that is, the value obtained from the last unit of the available supply of each component. However, when the consumed supply of a component for an order is much greater than 1, the expected revenue that is displaced in generally not marginal value times the quantity consumed. This is because in a limited supply and high demand situation, each additional unit of supply costs more than the previous one.

Figure 4:
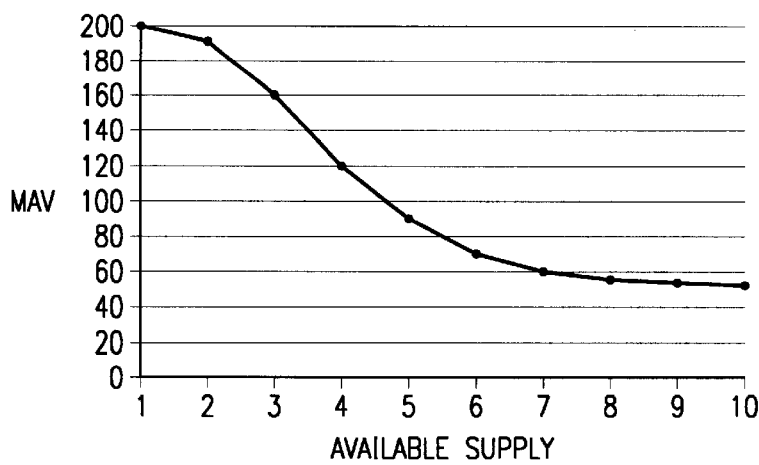
FIG. 4 illustrates MAV values as a function of available supply.

FIG. 4 illustrates a typical MAV curve as a function of the supply of a critical component. The curve is usually monotonically decreasing although its slope decreases at either end and is maximum somewhere close to the middle. The area under the curve is the expected revenue from the available supply of the component. When the demand is much less than the supply, the MAV approaches 0. Because demand is probabilistic, "demand less than supply" is meant in a probabilistic sense. Generally, it is mean+3*standard deviation, which covers, for a normal distribution, close to 99.99% of possible demand values.

The curve of FIG. 4 illustrates how MAV varies as a function of supply of material for a particular time horizon, i.e., one day. As stated above, MAV can be thought of as the value of the last unit of supply. The price to charge for a quantity Q for that day is not Q*MAV because MAV increases as each unit of supply is consumed. For Q less than some threshold, it may be acceptable to charge MAV as the price for each unit, but for larger Q such a price is unacceptable.

Figure 5:
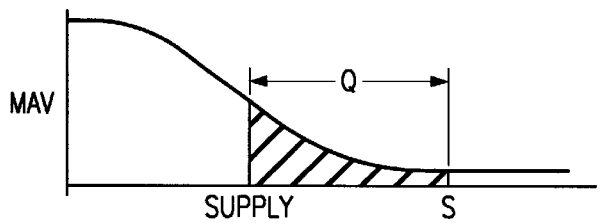
FIG. 5 illustrates the revenue displaced by charging MAV for a quantity Q.

FIG. 5 illustrates the revenue displaced by pricing a component at MAV for a quantity Q. The total area under the curve is the total potential revenue from a supply S of the component. The shaded area represents the displaced revenue. The displaced revenue is not simply the MAV at S because as Q is removed (S decreases), the MAV increases. The floor for the negotiating price per unit of product for that component should be equal to:

Revenue Displaced/Q

For a product having multiple components, a MAV versus supply curve for each component must be considered.

As stated above in connection with FIG. 1, the pricing process can be interpreted in terms of displaced revenue. In FIG. 5, the displaced revenue could be calculated by integrating the curve between S and S−Q. However a simpler variation uses the MAV process described in connection with FIG. 1 to obtain a total potential revenue from a given supply, S. Then revenue from the MAVs for S−Q is similarly calculated. The difference in revenues between the two cases approximates the area of the curve between S and S−Q, and thus approximates the revenue displaced by the MAVs for Q. In other words, the formula for MAVs is applied with the displaced revenue coming from solving the MAV problem twice. For a product having multiple components, the MAVs are calculated for each components and the component revenues added, thereby obtaining revenues for the product.

In the method of FIG. 1, there was no mention of lead time. The quantity Q was that for a particular horizon, say a day. That is, all of Q were going to be produced during the day in question. In reality, a customer will often agree to limit orders for a total of Q over a contract period of, say a year. Each time the customer calls, the maximum quantity will be $Q_{max}$. However delivery will be expected within a time period, LT.

The value management pricing process can be used to determine what the negotiating price should be for a specified lead time. For purposes of this description, the following assumptions are made: the orders for $Q_{max}$ will come randomly and uniformly distributed within the period of contract; a subsequent order will only come after a current order has been fulfilled; the time it takes to manufacture the order is equal to LT, i.e., delivery is instantaneous; the horizon for MAV□s is daily.

With regard to the above assumptions, the assumption of uniform order distributions is to simplify analysis—other order distributions can be handled. The second assumption can be relaxed and generalized so as to become a negotiating variable with the customer. The third assumption is easy to relax, by adding another offset to the manufacturing period. The fourth assumption can be generalized such as to include multiple days□ horizon or several horizons within a day.

Figure 6:
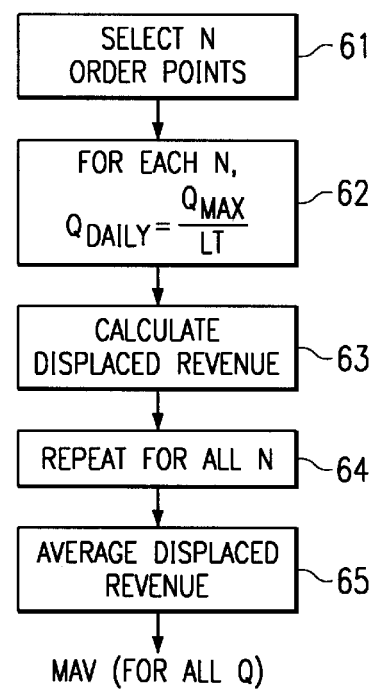
FIG. 6 illustrates a process of determining MAV for lead time pricing.

FIG. 6 illustrates a method of determining MAV for lead time pricing. The method assumes a MAV curve such as that of FIGS. 4 and 5, which may be obtained using the pricing process of FIG. 1. Step 61 is randomly selecting a sample of N order points over the contract period with equal probability. In Step 62, for a first order point, consider the next LT days and set $Q_{daily}=Q_{max}/LT$. In Step 63, determine the displaced revenue. In Step 64, repeat for all the sample points. In Step 65, calculate the average displaced revenue. The result of the average is a floor on the negotiating price for the quantity Q, referred to herein as $MAV_{negotiation}$. For a product having multiple components, the process of FIG. 6 is repeated for each component and the results added together.

Figure 7:
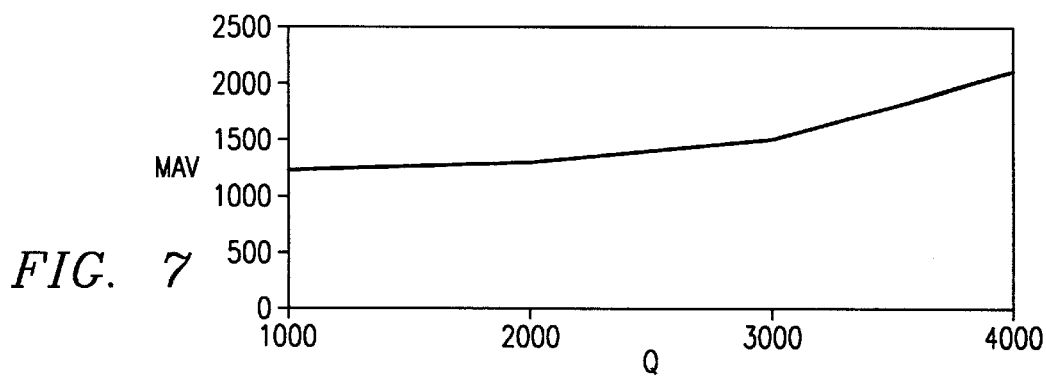
FIGS. 7 and 8 illustrate MAV as a function of order size, Q, and lead time, LT, respectively.
Figure 8:
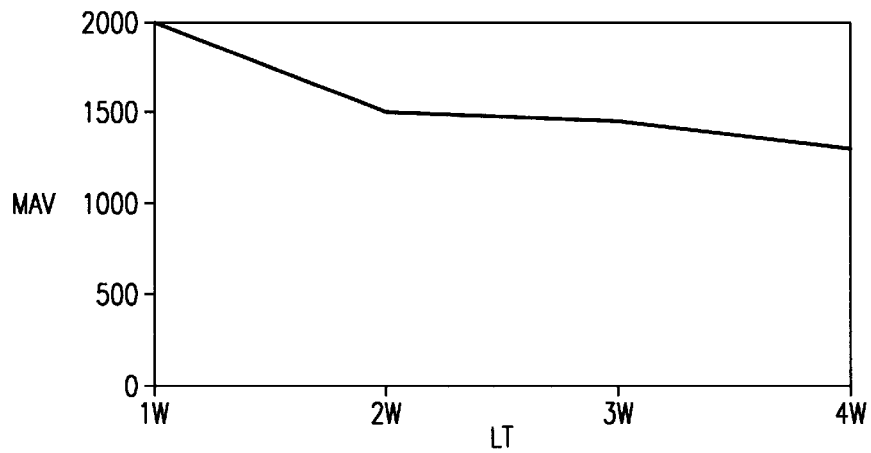

FIGS. 7 and 8 illustrate MAV as a function of maximum order size, Q, and of lead time, LT, respectively. The MAV values are those calculated using the process of FIG. 6.

As part of negotiations, a manufacturer could insist on granting no more than a certain number of orders, $Q_{maxfreq}$, drawn against the total order over the contract period. Each order is a disruption on manufacturing operations, which the manufacturer would like to minimize. The order frequency is tied to $Q_{max}$, in that a higher number generally reflects a lower frequency. But there is nothing preventing the customer from making a large number of small orders and still be within the contract unless $Q_{maxfreq}$ is agreed upon. To accommodate order frequency, the process can include additional steps: First, assume a worst case of $Q_{max}$ occurring $Q_{maxfreq}$ times even though $Q_{max} \times Q_{maxfreq}$ may be greater than the total order quantity, Q. Next, set the total displaced revenue to be $R_{max}=MAV_{negot} \times Q_{max} \times Q_{maxfreq}$. The new negotiated price is $MAV_{negotiaton-maxfreq}=R_{max}/Q$. This method overestimates revenue and spreads it over a smaller quantity Q to take into account the higher allowed frequency. A related quantity to maximum frequency could be the minimum gap between subsequent orders. It can be converted into a corresponding maximum frequency to calculate the price quote.

Value Management for Make-to-Order Pricing

Make-to-order manufacturers (MTOs) are characterized by low inventory and cycle time. Many hi-tech manufacturers such as computer system integrators fall into this category. They cater to retailers as well as to individual customers, taking orders by telephone or online. MTOs tend to not produce a product until it is ordered. Usually MTOs advertise their items at a fixed price, with a maximum delivery time. At times, they may deliver sooner if the customer. However, conventionally, the price charged is the same, barring any volume discounts.

Another aspect of the present invention is directed to how MTOs can benefit from value management (VM). As explained above, a basic idea behind VM is components can be valued in terms of probabilistic demand. These values can be used to define products that provide greater value and to arrive at a product control policy. The net effect of the product design and a product control policy can be significant gains in profit margins.

Figure 9:
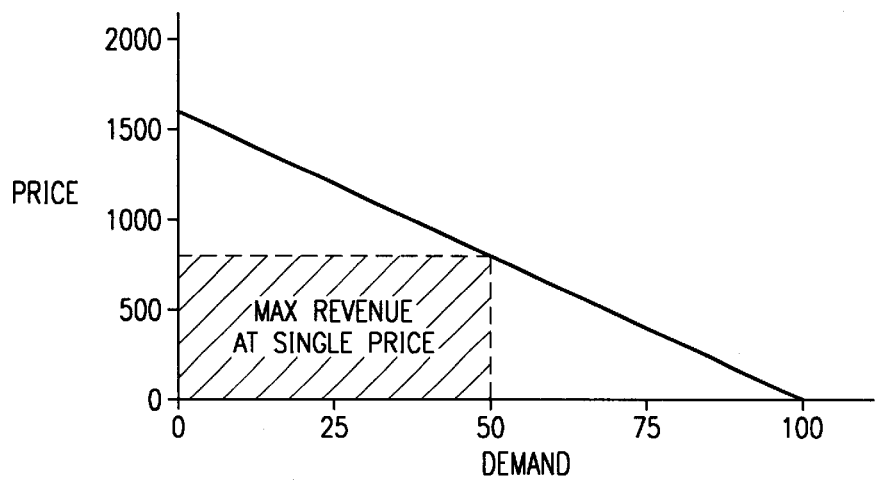
FIG. 9 illustrates a price-demand curve for a product, and compares maximum revenue at a single price to total potential revenue at multiple prices.

FIG. 9 illustrates a linear price-demand curve for a product, P. As explained below, when only a single price is to be charged, the curve can be used to determine an optimal price. The curve can also be used to determine a total potential revenue that could be realized (theoretically) if multiple prices were charged.

Suppose a MTO manufacturer sells P at a fixed price of $800. At $1600, the demand is almost 0, and at 0, the demand is high (limit it to 100). From this information, the single price at which total revenue is maximum can be determined. If any (price, demand) pair on the curve is chosen as (r,d), the total revenue, R, is:

$$R=rd$$

, and the equation for the line is:

$$r=md+c$$

, where m=−1600/100 and c=1600. Multiplying both sides by d, then:

$$R=d(md+c)$$

$$=md^2+dc$$

, and taking the derivative:

$$dR/dd=2md+c$$

To maximize R, the derivative is set to zero, thus:

$$0=2md+c$$

$$d=-c/2m=1600/32=50$$

$$r=-16(50)+1600=800$$

The realized revenue from the single price of $800 is 800*50=$40,000.

However, the total revenue "potential" (one that would result from charging different prices for different demands) is 100*1600/2=$80,000. Thus, a single price that maximizes revenue ($800) is only half the total potential revenue that could be realized from different prices for different products. The potential revenue is:

$$(-c/2m)(md+c)=-cd/2-c^2/2m$$

The maximum revenue is:

$$R_{max}=-c(-c/(2m))/2-c^2/2m$$

$$==c^2 \div 4m$$

The potential revenue is $cb \div 2 = -c/2m = 2(R_{max})$, hence the result.

If the goal is to maximize profit (revenue−cost), then under the assumption of fixed cost, equations for profit can similarly be derived as follows:

$$p=r-z$$

$$=md+c-z+md+(c-z)$$

, where p is the profit per unit of product, the new intercept is m−z in place of c, and z is the fixed cost per unit of product. Total profit P is:

$$P=rd-dz$$

$$=d(md+c)-dz$$

The maximum profit (for a single price) occurs at d=−(c−z)/2m and the corresponding maximum profit is:

$$P_{max}=-(c-z)^2/4m.$$

The total potential profit is:

$$P_{pot} = \int_0^{-c/m} (mx+(c-z))dx = mx^2/2\Big|_0^{-c/m} + (c-z)x\Big|_0^{-c/m}$$

$$= c^2/2m - (c-z)c/m = -c^2/2m + cz/m = -(c-z)^2/2m + z^2/2m$$

$$= 2P_{max} + z^2/2m$$

The second term is negative because m is negative. As z increases, the potential profit compared to that for single price (optimum) decreases. For reasonable values of z, the potential increase in profit is substantial.

One aspect of the invention is realizing, for a MTO manufacturer, the potential profit opportunity described above. Suppose the item is a personal computer, which the MTO sells that for a price of $800, with a delivery time of 3 weeks. However, if the customer wants it the next day it could be done but for a price of $1200. Another price-delivery pair might be ($1100, 1 week). Once these products have been designed, there is a need for product control. The manufacturer does not want to simply fill the demand for various products as it comes in, but would rather deny some in the hope that there will be later demand. To make an objective evaluation, there needs to be a forecast of demand for the products out in future.

Thus, there are two levels of benefits. A first involves redesigning product and delivery times. A second involves forecasts of demand and an effective product control (PC) policy. Value management is fully realized by taking advantage of both levels of benefits. Product design is insufficient because of limited capacity (capacity includes both assets and materials), and without product control, the MTO may end up not realizing higher paying demand if demand at lower prices is high and comes first.

Assume that the process of product design yields the following products for a laptop manufacturer:

| Item | Product | Price ($) |
|---|---|---|
| Laptop = P | P (1 day delivery) | 1200 |
| P | P (1 week delivery) | 1100 |
| P | P (3 week delivery) | 800 |

Based on a price-demand curve such as that of FIG. 9, demand values can be assigned as single deterministic numbers. But in reality, demands are stochastic and are better characterized by a probability distribution. A better approach is to assign demand values for different "buckets" of prices. To this end and as a simple example, assume that the demand is 1 unit with a probability of 0.5. That is, there is a 50% chance the demand of 1 may not materialize. The demand probability table looks like:

| Product | Price ($) | Demand | Probability of the demand materializing |
|---|---|---|---|
| P1 (1 day delivery) | 1200 | 1 | .5 |
| P2 (1 week delivery) | 1100 | 1 | .5 |
| P3 (3 week delivery) | 800 | 1 | .5 |

It is assumed that each laptop needs 1 unit of some scarce material. The PC is assumed to be first-come first serve (FCFS).

Appendix A compares expected revenues with and without product design (PD) for various values of available capacity (AC), measured as the units of the scarce material available for a particular time unit, say, one day, of manufacturing. "AP" is asking price (explained below), and "ER" is expected revenue. For the non-PD case, there are 3 items with the same price of $800. For the PD case, the 3 products are P1 ($1200), P2 ($1100) and P3 ($800). By definition, the order in which they arrive is P3, P2 and P1. The same labels indicate the corresponding price, and the context will make clear what the label means. The control policy is assumed to be FCFS.

The following are the general formulas for AC=3, 2 and 1, with s1, s2 and s3 denoting the corresponding probabilities (assumed to be 0.5 in this case). Also, q1=1−s1, q2=1−s2 and q3=1−s3. ER(n) is the expected revenue for available capacity of n.

| AC | Formula for Expected Revenue under FCFS |
|---|---|
| 1 | s3P3 + q3(s2P2 + q2s1P1) |
| 2 | s3(P3 + s2P2 + q2s1P1) + q3(s2(P2 + s1P1) + q2s1P1) |
| 3 | s3(P3 + s2(P2 + s1P1) + q2s1P1) + q3(s2(P2 + s1P1) + q2s1P1) |

Here P1, P2 and P3 denote prices.

In Appendix A, the units of capacity (and the resulting APs) are for a given time horizon, i.e., one day. In the first row is the expected revenue for values of available capacity under the assumption that the same revenue ($800) is received from even those customers who would have paid a higher price. The expected revenue (ER) from the last single product for a given capacity is the difference between the ER for the AC minus the ER from one less AC, resulting in the AP. The value of each additional unit of capacity goes down as AC increases, everything else remaining same. The additional value of a unit of capacity is related to PC, as will be explained below.

Figure 10:
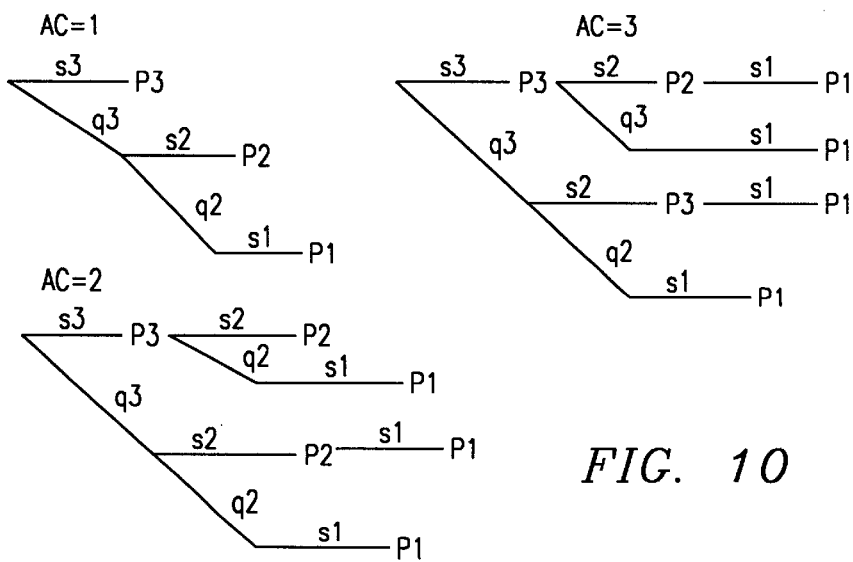
FIG. 10 illustrates how expected revenue for a make-to-order manufacturer can be calculated from a binary tree.

FIG. 10 illustrates how the expected revenue for a MTO manufacturer (different prices for different delivery times for the same product) can be graphically represented as a binary tree. The formulas for ER are the same as set out above.

No forecasts are needed for first-come first-serve (FCFS) as a price control policy (PCP), but are used for other PCP. The following discussion explains how using a PCP other than FCFS adds additional revenue opportunity. Prices are called "values", understanding that it is assumed that the cost is zero. That is not true, but for the purposes of example, the assumption is that price is the same as value, and when cost data is available adjustments can be made.

Appendix B sets out APs and ERs, assuming a PCP (non FCFS). The PCP is that at any given time, for various units of capacities for particular time horizons (days for example), for each row (product), calculate the ER from those resources (capacities) if it is decided to accept an order. For AC=1, PC(3W), the ER is $825 as opposed to $850 if only PC(1W) were accepted. Thus for optimal control, PC(3W) for AC=1 should be rejected. $850 is the asking price for AC=1. This is the minimum price (value) to accept. At AC=1, PC(3W) ($800) is rejected since its ER is less than the AP. However as the AC increases, the value of the added capacities goes down. For AC=2, any order is accepted; the AP (ER(2)–ER(1) under optimal control) is $550 and isless than the ER for the lowest product offering. AP goes even lower at AC=3 ($150) and ultimately to 0 at AC=4.

The asking price (AP) for a given value of AC is the maximum expected revenue for this last unit of capacity. Thus for AC=1, AP=$850 with the control policy being to reject PC(3W). As stated above, AP is a function of PC. Comparing the results of Appendices A and B, for AC=1, the AP for the non-FCFS PCP is $850 versus $825 for FCFS. At AC=2, it is higher for FCFS simply because it was sub optimal for AC=1. At AC=3, the two are the same and the two controls become the same operationally. Generally a PCP is needed when there is limited capacity with respect to demand.

Typically, business practice does not allow for varying prices for the same physical item since the customer does not perceive added value. However by recognizing that there is an underlying higher paying customer demand that can be tapped by tying delivery time to the product, more revenue is extracted. A control mechanism assigns allocations to each product based on the available capacity for the time horizon (day, week or whatever is appropriate) under consideration. In the example, all capacity is available for an order of PC(1D), and then there is some fraction of the capacity available to PC(1W), and a lower fraction to PC (3W). Because the calculations assume one order at a time, the calculations may change if the order quantity is large.

The following steps can be taken to make a significant positive impact on revenue and profit. First, analyze underlying demand to obtain a relationship between price charged and demand. The result is a product design (PD) scheme. Design history databases for help in demand forecasts. Institute business process flows that employ a product control scheme. This will result in computer implemented methods and screens for order processors that will provide visibility into future plant/manufacturing facility status and also what products will be made available in what quantities. Various computer-implemented supply management tools could be used, each corresponding to one of the steps. The modules could be, for example, Demand Analyzer, Forecasting Engine and Optimizer modules, such as those available from i2 Corporation.

The above examples include simplifying assumptions to illustrate numerically the PC and PD process. However, there may be some real world realities that need to be addressed. If the order quantity is more than a given threshold, the PC scheme will have to be made more sophisticated since the calculated AP is for the last unit of capacity and may change as orders come in. If the MTO manufacturer has other suppliers, the complete upstream supply chain may have to be considered and its reliability factored in depending upon the relationship between the two. The downstream chain may also be important. If there are multiple items and capacity units (say more than one work center or materials) the VM model needs to be generalized. Once the multiple items have been mapped into multiple products, the problem is conceptually similar to one item that has been productized. The multiple resources can be handled by arriving at an AP for each resource (constrained or not—in which case it could be small or 0). If the sum of the utilized resources' AP is less than the value being obtained then the product can be made available.

It should also be noted that the PC relies on the availability of unconstrained demand, i.e., demand that exists for a product regardless of whether it will be available or not. In reality the recorded history will only have actual realized demand (or constrained demand). This can place additional burdens on the forecasting algorithms since they use the histories to forecast.

Determining the Amount of Key Components Needed

In another embodiment of the present invention, it is possible to determine what key components are needed to be purchased in order to maximize profits in a high tech, made to order situation. The primary decision variables of the planning problem are the amount of key components to commit to buying over a planning period, T. These quantities, Q, for different Ts are to be determined separately but are not independent of each other. For instance, if a product or component is at the end of its life cycle, its value will be zero or near that after some T. But for other key components, this value will not be zero. The planned quantities of the two should not fail to take into account this phenomenon. In some cases planned quantities can be a continuous function of time but the state of the current business environment disallows such a framework. Also, a unique feature of the model of the present invention is that demands for the product are allowed to be probabilistic. In addition, the consume-per (usage) for the modeled level of products (also called platforms) of the key components is assumed to be a random variable with a known distribution. This number is statistical in nature. Consider, for example, a family of personal computers (PCs) where each member (platform) consumes a potentially different amount of key component from that of another member of the family. Therefore, to represent the consume-per at a platform level these individual consume-pers of the key components must be aggregated. One way to do that is to use mean values. A distribution can be used to increase precision. Also, the equations will only use up to the second central moment (the standard deviation) even though a distribution is being used. Before providing a mathematical formulation, a dynamic description of the problem that the mathematical model captures will be formulated. Then, the mathematical model, the solution technique and its basis will be discussed.

Dynamic Description of the Planning Process

A personal computer manufacturer or similar manufacturer (PCM) needs to plan key components for the next m time periods starting at $t_1, t_2, \ldots t_m$. The length of each time period may not be same. Let this length be represented by $l_1, l_2, \ldots l_m$. However it does not need to firm up the commitment for time periods $t_{j+1}$ and beyond because they are beyond the lead time requirements for the key components. The current time t is less than $t_1$. Different components may need different lead times for ordering (planning). The personal computer manufacturer or similar manufacturer will run a planning system to me plans for time periods 1,2, . . . m. In running this plan the personal computer manufacturers and similar manufacturers will need to know what the demand distributions for various platforms are for each of the periods and their correlation of the demands (2-way only). In addition the prices for these platforms in each period are known as are the costs of the components in each time period. The attach rate (consume-per) distributions are given for each platform (attach rate is an average component use per platform). Thus all inputs can be a function of the time period. A personal computer manufacturer or similar manufacturer knows the current supplies for key components. If production is in the middle of a time period of execution the expected leftovers (EL) of key components available at the beginning of $t_1$ must be estimated. Therefore, whatever the optimal plan of supplies for $t_1$ is, the ELs for corresponding key components will be subtracted out. This optimal plan simply procures as many of each key component as possible until the marginal value of a key component equals its cost.

In theory there will be some limits on how much can be procured in each time period. The optimization procedure will appropriately determine that. Note that ELs can be computed for all time periods successively. However to account for end-of-life-cycle key components/platforms, both a forward and a back sweep will be used so that leftovers are not counted as components with no value. The marginal value of a key component in time period (TP) $t_j$ will impact the supply in the previous time period, $t_{j-1}$.

Having determined a plan for each TP, the supplies for the next TP for which the lead time constraint is coming up can be determined. It is possible it may be for only a subset of the totality of key components. But all key components can be continued to be plan for on an ongoing basis, firming up only those whose lead time constraint is imminent thus utilizing latest available information.

This last observation helps establish an operational guideline for a planning system. Based on business considerations, planning periods are divided in to periods, such as quarters. A larger planning horizon is established that covers a number of these periods. The system is run close whenever a supplier (for a key component or a set of key components) is close to a lead time limit. Usually this will be for the next planning horizon that is about to be entered, but could also be a later one (in which case the plan for these key components for the next planning horizon has probably already been firmed up). Any shortfall/excess during a planning horizon is handled through the terms of the contract which may allow expediting key components at or above the agreed component cost depending on whether the excess amount is outside an agreed upon upward deviation from the agreed plan.

Mathematical Model of the Material Planning Problem (MPP)

The following assumptions are made with regards to the formulation. Note that the consideration of expediting cost and constraints other than hard lower and upper limits are disregarded.

1. Demands for platforms are probabilistic and may be statistically correlated with each other. Only two way correlations will be considered.
2. The attach rate of a product vis-a-vis a component is stochastic. However, its mean and standard deviation will be used.
3. Demands for platforms are for a particular time period (horizon). Even though each TP has a length, for purposes of demand it is considered a point in time.
4. The demand for a platform for a TP realizes over a period of time starting prior to the start of the planning horizon and when the TP begins, all demand is supposed to have materialized for the particular TP.
5. The demand for a platform may not be satisfied in any period other than the one in which it materializes or expected to.
6. The decision variables (supply vector) and the platform demands are continuous real number values. The decision variables can be discretized in the end.

Mathematical Formulation (Problem OPT)
Let
M=Number of key components
N=Number ofproducts (platforms)
S=Supply vector ofM components for a given time horizon
V=N—Vector of unit product prices
J=Set of all possible product control policies (PCP)
R(S,K)=Optimal expected revenue resulting from a given supply S of components by following a given policy K for product control
W(S)=Incremental—cost vector of M functions for the M components (only the portion of cost resultingfrom the-decision to procure S components)
P=An N vector with the $i^{th}$ component being the unconditional demand distribution for the ith product
C=Covariance matrix of size N×N with the $(i,j)^{th}$ element being the correlation coefficient between demandfor product i and j. The diagonal consists of all 1's
$U_\mu$=Mean attach rate matrix (MAM)=An N×M matrix, the $(i,j)^{th}$ element corresponding to the mean attach rate of platform i for component j
$U_\sigma$=Variation in attach rate matrix (VAM)=An N×M matrix, the $(i,j)^{th}$ element corresponding to the standard deviation of attach rate of platform i for component j
$F_l$=M vector of functions that specifies lower limits for the corresponding component supply
$F_u$=M vector of functions that specifies upper limits for the corresponding component supply
H(S,K)=Maximum Expected profit for a given S and PCP K

OPT:

$$\text{MAX} \, H(S, K) = R(S, K) - \sum_{i=1}^{M} W^i(S^i)$$

$$S \in R^M, K \in J$$

$$S \geq 0$$

$$F_l \leq S \leq F_u$$

NOTE: For a matrix/vector X, $X^i$ is the $i^{th}$ row/element which could be a function or a scalar Problem OPT is the main optimization to solve. Its output is the optimal product control policy (PCP) $K^*$ as well as the optimal component supply vector $S^*$. $S^*$ depends on the product demands, their correlation, product prices, component costs and the attach rates which are given and cannot be controlled. However in most business situations, PCP is also a given. For example many manufactures have a First Come First Serve (FCFS) policy. Therefore for purposes of solving OPT it will be assume a given K, and specifically an FCFS policy. Therefore the only decision variable is S and in the following analysis the dependence on K will be dropped. Also, the dependence of the optimal expected revenue, R( ), on other quantities like demands etc. have been dropped to emphasize only the decision variables since they are always given. These will later be used in discussion of the related problem of computing R( ) since there the interactions of all these becomes more pertinent.

All practical methods of solving OPT require knowledge of the objective function, H(S), for any feasible value of S, the supply vector. In addition, many modern methods need the gradient information for a more efficient search of the solution space and therefore require the gradient of the objective function with respect to (wrt) S. When the constraints are nonlinear, the same requirement is imposed on them too. However the focus will be on the objective function assuming that such information for the constraints is readily available. Both these pieces of information can be computed for the incremental cost vector function W(S). Often, it is a linear function of S. However computing the optimal expected revenue, R( ) as well as its gradient poses special problems since some of the underlying variables that it depends on are either stochastic (demands and possibly attach rates) or somewhat difficult to formulate (PCP). Also R( ) is the result of an optimization problem itself. For a given supply vector S (not necessarily optimal) the maximum revenue that can be extracted given the product demands etc. and PCP K needs to be computed. This is because once S is fixed (optimal or otherwise), the cost component of the objective function is fixed and hence maximizing R(S) will maximize profit for a given S. For a K other than FCFS there will be some other control variables (CV), (like ATP's for an allocation policy and marginal values for a value based policy etc.) whose determination will become part of the solution of this sub optimization problem since these are the only decision variables. However for the special case of K being FCFS there are no decision variables since FCFS implies a no control policy. Thus a sub optimization problem SUBOPT is defined as Let $Z(J,CV, S,P, C,V,U_\mu, U_\sigma)$=The maximum expected revenue for a specific policy J and the set of control variables CV
SUBOPT:

$$R(S, P, C, V, U_\mu, U_\sigma) = \text{Max} Z(J, CV, S, P, C, V, U_\mu, U_\sigma) \forall\, CV \text{ and}$$

$$\frac{\partial R(S, P, C, V, U_\mu, U_\sigma)}{\partial S}$$

However J≡FCFS and there are no CV's. So the problem becomes
SUBOPT:

Compute $R(S, P, C, V, U_\mu, U_\sigma)$ for $J \equiv FCFS$ and $$\frac{\partial R(S, P, C, V, U_\mu, U_\sigma)}{\partial S}$$

One approach to solving SUBOPT is to use a monte carlo (MC) simulation to compute R as well as its gradient. This is a computationally intensive method which uses brute force, to capture complicated situations (expediting costs and other features). But other than the case of FCFS, its utility will be quite limited. In more complex PCP it may be needed to solve another optimization problem (another monte carlo).

A novel approach to solving SUBOPT that is computationally superior to the monte-carlo simulation based method can be formulated.

Analytical (iA) Approach to Solve SUBOPT

By casting the optimization problem OPT for only one time period, the overall planning problem has implicitly been conceptually decomposed into a number of problems, one for each time period. After solving for a time period, the various solutions can be confirmed together towards the end. In the same way a computational decomposition of SUBOPT is needed.

The following complexities arise in arriving at an analytic approach to solving SUBOPT:

1. Since demands are stochastic, the revenue function involves integrals, making the problem difficult. Stochastic LP (SLP) approaches may be applicable. It is not clear how effective SLP will be in computing the derivative of the function.
2. A PCP like FCFS (no control really) makes any LP formulation difficult if not impossible. Only a discrete PCP is easily formulated as an LP.
3. Demands can also be correlated making even the application of SLP suspect.
4. Allowing the attach rates to be stochastic is a further complication to any solution process.

Before tackling these complexities SUBOPT can be simplified.

Notice that all key components have the same view of the statistical demands of all platforms using it. This demand can easily be converted to that of the particular key component using simple transformations. So at a component level the demands (including the stochastic attach rate) seem to be manageable. It is clear from the nature of SUBOPT that the derivative of revenue function for a component can be interpreted as the contribution to the total revenue (all revenues, profits and quantities derived from them are expected values unless explicitly mentioned otherwise) of a unit increase in the supply of any given component. (Strictly speaking it does not have to be an increase; it could equally well be a decrease in supply causing a similar decrease in total revenue. But often, for brevity of expression, it is label as an increase in supply and its effect on revenue without loss of generality and accuracy).

When a component supply is increased by a small amount, it cannot but increase the total system revenue. However, because of the statistical nature of the demand, it cannot be known which products demands cause this increase. In FCFS, it is necessary to assume that the demand consists of a mixture of various platform demands with relative intensities of each (demand rate) proportional to their respective mean demands. But due to differing attach rates of various platforms for key components, it can be concluded that any platform that only uses this key component and the platform has some unmet demand at current levels (in a statistical sense) then if the platform happens to need an extra supply, it will be able to grab the extra supply. However platforms using other key components may not be able to utilize this extra capacity if one or more of the other key components it uses are in short supply not by the latter. Therefore, the revenue contribution by an extra supply of a key component depends in a complicated way on the demands and the current supply levels of all key components. On the average any platform that uses the key component will have only a certain fraction of its revenue captured. This effect is called gating since other components in short supply can prevent the extra revenue from being captured.

If the average fraction of revenue of each platform that can be captured by a marginal increase in component can be computed, it might be possible to decompose SUBOPT into solving smaller, manageable problems at component level. It will most probably involve an iterative process as is usually the case.

Platform Price Mapping Function

Consider the following linear programming example having constraints described by Equations (2) through (7):

| LP. | | Primal | | Dual | |
|---|---|---|---|---|---|
| $\text{Max}\, 35x_1 + 25x_2 + 6x_3 + x_4$ | | | | | |
| $x_1 + x_2 + 3x_4 \leq 10$ | (2) | $x_1$ | 6 | 1 | 35 | $\lambda_1$ |
| $2x_2 + 5x_3 \leq 100$ | (3) | $x_2$ | 1 | 2 | 1.2 | $\lambda_2$ |

-continued

| LP. | | Primal | | Dual | |
|---|---|---|---|---|---|
| $5x_1 + 7x_3 \leq 300$ | (4) | $x_3$ | 19.6 | 3 | 0 | $\lambda_3$ |
| $2x_1 + 5x_2 + 3x_4 \leq 250$ | (5) | $x_4$ | 1 | 4 | 0 | $\lambda_4$ |
| $x_2 \geq 1$ | (6) | | | 5 | -12.4 | $\lambda_5$ |
| $x_4 \geq 1$ | (7) | | | 6 | -104 | $\lambda_6$ |

The objective function can be interpreted as maximizing the revenue from products 1, 2, 3 and 4. The price of each is 35, 25, 6 and 1 respectively. Equations (2) through (7) are constraints on the amount of each product that can be produced linked through linear equations. Equations (2) through (5) can be seen as resource constraints with each product consuming varying amount of each resource (and not all of them using each resource). The right hand side of each of these is the maximum available resource. Equations (6) and (7) are lower limits on products 2 and 4 although they can be called as resource constraints by defining artificial resources by multiplying both sides by −1 and reversing the inequality sign. For purposes of this discussion each of these equations are assumed to represent a unique resource. The primal and dual solutions of the two are also shown. A known economic principle is that if two products with a stochastic demand are using the same resource then each is allocated up to the point when the marginal values of both become equal. This principle extends to multi product case too. When the demands are deterministic naturally the product with the highest price (or margin if maximizing profit) is allocated up to the point there is no more product demand available. If any more resource is available, it is allocated to the next highest price product and so on. In this example demand can be assumedto be infinite for each but due to limited resources only so much of it can be satisfied. But what if you have more than one resource. What is the criterion for allocation and how is the price of the product mapped onto the component? Is it the full price? Let us surmise that a product price.maps according to the following formula:

$$\text{Mapped Price (on component } i \text{ for product } j) = \text{Product Price} * \frac{\lambda_i}{\sum_{l \in S^r_j} \lambda_l U^l_j}$$

$S^r_j$ = Set of resources used by product j
$U^l_j$ = Average Usage of resource l by product j In the following table it can be seen that all products that use a resource and have non-zero allocation, have their prices mapped according to this formula. The resource value (dual/gradient) is the mapped price of each product onto the resource, mapped according to this formula. But the problem is that the duals are not known beforehand.

| Equation | Product 1 | Product 2 | Product 3 | Product 4 |
|---|---|---|---|---|
| 1 | $\frac{35\lambda_1}{\lambda_1} = 35$ | $\frac{25\lambda_1}{(\lambda_1 + 2\lambda_2 + \lambda_5)} = 35$ | | $\frac{\lambda_1}{(3\lambda_1 + \lambda_6)} = 35$ |
| 2 | | $\frac{25\lambda_2}{(\lambda_1 + 2\lambda_2 + \lambda_5)} = 1.2$ | $\frac{6\lambda_2}{5\lambda_2} = 1.2$ | |
| 5 | | $\frac{25\lambda_1}{(\lambda_1 + 2\lambda_2 + \lambda_5)} = -12.4$ | | |
| 6 | | | | $\frac{\lambda_6}{(3\lambda_1 + \lambda_6)} = -104.4$ |

For a 1 product 1 resource case with demand for product stochastic the following holds.

$f(x) = $ pdf of product demand $v = $ product price $s = $ supply of the resource with unity usage (consume-per)

$$R = \text{Expected revenue} = v \int_0^S x f(x) dx + vs \int_S^\infty f(x) dx = vE\{X \mid X < s\} + vsPr\{X \geq s\} \text{ and}$$

$$\frac{dR}{ds} = v(+1)sf(s) + s(-1)f(s) + v \int_S^\infty f(x) dx = vPr\{X \geq S\} = \text{Marginal Value } (MV) \text{ of resource}$$

Assuming that the price mapping discussed above is correct, then in the above formula instead of using the price v of the product its mapped value in case of multiple resources (key components) being used by a product can be used. However, in order to obtain a mapping it is necessary to know what all the marginal values are. This leads to an iterative scheme since the input marginal values (MVs) are not necessarily the same as the output ones. The process proceeds until convergence is obtained.

Considering another example where demands are statistical and products have discrete (as opposed to nested) allocations.

Platform Price Mapping Function—Discrete Allocation with Statistical Demands

Below is a 2 component 3 product case. Product 1 uses component 1 only and 2 uses component 2. Product 3 uses both components. Their demands are characterized by a distribution function (actually its complement).

| Product | Price | Usage Comp. 1 | Usage Comp. 2 | Demand Distribution (Complement) |
|---|---|---|---|---|
| 1 | $P_1$ | $U_1^1$ |  | $G_1(x) = \text{Prob}\{X \geq x\}$ |
| 2 | $P_2$ |  | $U_2^2$ | $G_2(x)$ |
| 3 | $P_3$ | $U_1^3$ | $U_2^3$ | $G_3(x)$ |

| Component | Supply |
|---|---|
| 1 | $S_1$ |
| 2 | $S_2$ |

The following equations set up the optimization problem as problem A.

Problem A:

$$\text{Max } V = V_1 + V_2 + V_3$$

$\theta_j$=Allocation for product j, j=1,2,3
$V_i$=Revenue from $i^{th}$ product
V=Total Revenue $$\theta_1 U_1^1 + \theta_3 U_1^3 = S_1$$

$$\theta_2 U_2^2 + \theta_3 U_2^3 = S_2$$

$$V_j = P_j \int_0^{\theta_j} x f_j(x) dx + \theta_j P_j \int_{\theta_j}^{\infty} f_j(x) dx, \ j = 1, 2, 3$$

$$\frac{\partial V_j}{\partial \theta_j} = P_j \int_{\theta_j}^{\infty} f_j(x) dx = P_j G_j(\theta_j)$$

The lagrangian of problem A will be calculated to convert the problem into an unconstrained one.

The lagrangian of problem A is:

$$V' = V - \lambda_1(\theta_1 U_1^1 + \theta_3 U_1^3 - S_1) - \lambda_2(\theta_2 U_2^2 + \theta_3 U_2^3 - S_2)$$

The necessary conditions for optimality (from calculus) are:

$$\frac{\partial V'}{\partial \theta_1} = \frac{\partial V}{\partial \theta_1} - \lambda_1 U_1^1 = 0$$

$$\frac{\partial V'}{\partial \theta_2} = \frac{\partial V}{\partial \theta_2} - \lambda_2 U_2^2 = 0$$

$$\frac{\partial V'}{\partial \theta_3} = \frac{\partial V}{\partial \theta_3} - \lambda_1 U_1^3 - \lambda_2 U_2^3 = 0$$

OR $$\frac{\partial V}{\partial \theta_1} = \lambda_1 U_1^1$$

$$\frac{\partial V}{\partial \theta_2} = \lambda_2 U_2^2$$

$$\frac{\partial V}{\partial \theta_3} = \lambda_1 U_1^3 + \lambda_2 U_2^3$$

Since $$\frac{\partial V}{\partial \theta} = \text{Price} * \text{Prob}\{X \geq \theta\} = \text{Price} * G(\theta)$$

$$P_1 G_1(\theta_1) = \lambda_1 U_1^1$$

$$P_2 G_2(\theta_2) = \lambda_2 U_2^2$$

$$P_3 G_3(\theta_3) = \lambda_1 U_1^3 + \lambda_2 U_2^3$$

This leads to (using the inverse of the G( ) function)

$$\Rightarrow$$

$$\theta_1 = G_1^{-1}\left(\frac{\lambda_1 U_1^1}{P_1}\right)$$

$$\theta_2 = G_2^{-1}\left(\frac{\lambda_2 U_2^2}{P_2}\right)$$

$$\theta_3 = G_3^{-1}\left(\frac{\lambda_1 U_1^3 + \lambda_2 U_2^3}{P_3}\right)$$

Substituting $\theta$'s into the resource equations we get $$G_1^{-1}\left(\frac{\lambda_1 U_1^1}{P_1}\right) U_1^1 + G_3^{-1}\left(\frac{\lambda_1 U_1^3 + \lambda_2 U_2^3}{P_3}\right) U_1^3 = S_1$$

$$G_2^{-1}\left(\frac{\lambda_2 U_2^2}{P_2}\right) U_2^2 + G_3^{-1}\left(\frac{\lambda_1 U_1^3 + \lambda_2 U_2^3}{P_3}\right) U_2^3 = S_2 \text{ or}$$

$$G_1^{-1}\left(\frac{\lambda_1}{P_1 \lambda_1 / (\lambda_1 U_1^1)}\right) U_1^1 + G_3^{-1}\left(\frac{\lambda_1}{P_3 \lambda_1 / (\lambda_1 U_1^3 + \lambda_2 U_2^3)}\right) U_1^3 = S_1 \quad (8)$$

$$G_2^{-1}\left(\frac{\lambda_2}{P_2 \lambda_2 / (\lambda_2 U_2^2)}\right) U_2^2 + G_3^{-1}\left(\frac{\lambda_2}{P_3 \lambda_2 / (\lambda_1 U_1^3 + \lambda_2 U_2^3)}\right) U_2^3 = S_2 \quad (9)$$

The two equations (8) and (9) can be considered to be in 1 variable each (in terms of the corresponding lagrangian parameter $\lambda$) provided product prices are mapped according to the earlier stipulated mapping function. This mapping can be shown too be true for the case of N product-M component case.

In the following section a quasi-quantitative explanation for an FCFS case is presented.

Platform Price Mapping Function—Probabilistic Reasoning

Considering a 6 platform-3 component case.

| Product | Comp1 | Comp2 | Comp3 | Price | Mean Demand |
|---|---|---|---|---|---|
| 1 | 1 |  |  | $P_1$ | $\mu_1$ |
| 2 | 1 |  |  | $P_2$ | $\mu_2$ |
| 3 |  |  | 1 | $P_3$ | $\mu_3$ |
| 4 | 1 | 1 |  | $P_4$ | $\mu_4$ |

-continued

| Product | Comp1 | Comp2 | Comp3 | Price | Mean Demand |
|---------|-------|-------|-------|-------|-------------|
| 5       |       | 1     | 1     | $P_5$ | $\mu_5$     |
| 6       | 1     | 1     | 1     | $P_6$ | $\mu_6$     |

Figure 11:
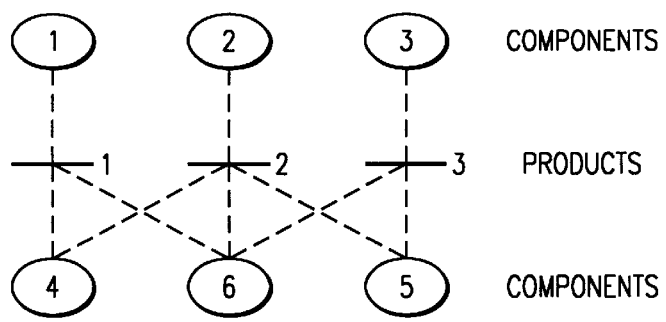
FIG. 11 illustrate a six component, three product case showing the use of the components for each product; and, FIG. 12 is a flowchart illustrating the solving of subopt and opt over a single time period.

Each row corresponds to a platform (labeled as 1, 2, . . . 6) with each entry under the label of component beled Comp1, Comp2 and Comp3) indicating the consume-per. No entry means the component is not part of the platform. Only the mean demands are shown since the standard deviation of platform demand is not relevant here (any relevance it has is of a higher order than of interest here). Although mentioned earlier but to make it all cohesive, these are the assumptions:

1. CP is FCFS as opposed to discrete allocations
2. To simplify assume unity consume-per
3. Demand rate of each platform at any instant is proportional to its mean demand
4. Chance of a platform demand being at the head of a demand mixture in a time interval $\Delta t$ is proportional to its demand rate FIG. 11 is an illustration of the relationship between the platforms and components. To figure the marginal value of component 2, suppose its supply is $\theta_2$ and is raised by an amount $\Delta\theta_2$. What is the additional revenue that is expected to be capture? If a quantum of demand is observed, it is expected that a mixture of demands of all six products in proportion to their respective mean demands will be seen. What is the chance that the demand seen first will be that of a particular product? By assumption number 4, it is the ratio of its mean demand and the mean demand of all platform demands. To calculate the additional revenue $\Delta R_2$, the chance that a given platform demand, once it has appeared will be accepted, is needed. Recall that due to the gating effect by other components, mere appearance of demand is no guarantee of acceptance. The chance, $pr_j$, can be interpreted as the average fraction of additional revenue of product j that is accepted by component 2. The expression for $\Delta R_2$ expresses mathematically the expected additional revenue from all products that use it. From the point of view of a particular product, depending upon the level of detail needed to consider, this average can be computed as the fraction of the additional total revenue that comes its way that is accepted by it. This fails to take into account the fact that this product only uses certain components (may be just this one in which case all of its revenue is captured. Recall that at this stage (computation of $pr_j$) the conditional probability given that the particular product demand has appeared is being observed). In order to capture (conceptually) the potential additional revenue it is assumed that no gating is allowed to occur. That is, the supplies of other components used by this product raises by a small delta so that any demand about to be turned away due to gating is accepted. For j=2,4,5,6, $\Delta R$ can be written (the total system revenue) as $$\Delta R = \frac{\partial R}{\partial \theta_2}\Delta\theta_2$$

$$\Delta R = \frac{\partial R}{\partial \theta_2}\Delta\theta_2 + \frac{\partial R}{\partial \theta_1}\Delta\theta_1$$

$$\Delta R = \frac{\partial R}{\partial \theta_2}\Delta\theta_2 + \frac{\partial R}{\partial \theta_1}\Delta\theta_1 + \frac{\partial R}{\partial \theta_3}\Delta\theta_3$$

$$\Delta R = \frac{\partial R}{\partial \theta_2}\Delta\theta_2 + \frac{\partial R}{\partial \theta_3}\Delta\theta_3$$

Therefore the average fraction of product j(=2,4,5,6) revenue accepted can be estimated as $$pr_2 = \frac{\frac{\partial R}{\partial \theta_2}\Delta\theta_2}{\frac{\partial R}{\partial \theta_2}\Delta\theta_2}$$

$$pr_4 = \frac{\frac{\partial R}{\partial \theta_2}\Delta\theta_2}{\frac{\partial R}{\partial \theta_2}\Delta\theta_2 + \frac{\partial R}{\partial \theta_1}\Delta\theta_1}$$

$$pr_5 = \frac{\frac{\partial R}{\partial \theta_2}\Delta\theta_2}{\frac{\partial R}{\partial \theta_2}\Delta\theta_2 + \frac{\partial R}{\partial \theta_3}\Delta\theta_3}$$

$$pr_6 = \frac{\frac{\partial R}{\partial \theta_2}\Delta\theta_2}{\frac{\partial R}{\partial \theta_2}\Delta\theta_2 + \frac{\partial R}{\partial \theta_1}\Delta\theta_1 + \frac{\partial R}{\partial \theta_3}\Delta\theta_3}$$

But the derivatives in the expressions are nothing but the corresponding marginal values of components. Also since all consume-pers are 1, all $\Delta\theta$'s can be assumed to be the same. Thus:

$$pr_2 = 1$$

$$pr_4 = \frac{\lambda_2}{\lambda_2 + \lambda_1}$$

$$pr_5 = \frac{\lambda_2}{\lambda_2 + \lambda_3}$$

$$pr_6 = \frac{\lambda_2}{\lambda_2 + \lambda_1 + \lambda_3}$$

Thus the expression for the expected additional revenue is let $G(\theta) = Pr\{\text{Total demand} \geq \text{supply of } \theta\}$ $$\Delta R_2 = \left(\frac{P_2\mu_2}{\mu_2+\mu_4+\mu_5+\mu_6}pr_2 + \frac{P_4\mu_4}{\mu_2+\mu_4+\mu_5+\mu_6}pr_4 + \frac{P_5\mu_5}{\mu_2+\mu_4+\mu_5+\mu_6}pr_5 + \frac{P_6\mu_6}{\mu_2+\mu_4+\mu_5+\mu_6}pr_6\right)\Delta\theta_2 G(\theta_2)$$

The expression in brackets is the average mapped price of all products using component 2. We have $$\frac{\Delta R_2}{\Delta \theta_2} = \lambda_2 = p_2^{avg} G(\theta_2)$$

$p_2^{avg}$ = Average price of component 2

$$= \frac{P_2\mu_2}{\mu_2+\mu_4+\mu_5+\mu_6}pr_2 + \frac{P_4\mu_4}{\mu_2+\mu_4+\mu_5+\mu_6}pr_4 + \frac{P_5\mu_5}{\mu_2+\mu_4+\mu_5+\mu_6}pr_5 + \frac{P_6\mu_6}{\mu_2+\mu_4+\mu_5+\mu_6}pr_6$$

Similar results follow for other components. It can be generalized to the formula for mapping (with non-unity consume-pers) by setting the corresponding $\Delta\theta$'s to be not same but according to the relative usage of the product under consideration of the component with respect to component 2, which is the ratio of the two usage.

Algorithm to Solve SUBOPT

Now that a scheme to map product prices onto components exists, an algorithm to solve SUBOPT can be determined. Before developing the algorithm, some fundamental operations need to be developed to easier express the algorithm.

Notation: Unless otherwise noted $\mu$ and $\sigma$ stand as generic symbols for mean and standard deviation respectively. A subscript usually denotes a variable whose mean and standard deviation are under consideration.

Truncated Normal Distribution

Although the analysis so far has been in terms of general distributions, it is easier to perform many operations if the demands are assumed to be distributed according to truncated normal (defined it in terms of normal distribution). In real life many practical distributions fall in this category and it will be assumed that that is the case for product demands too. Even if not true it is found to be a reasonable approximation in many cases. If not, other demand model can be used if need be.

$$N(\mu, \sigma; x) = \frac{1}{\sqrt{2\pi}} e^{-\frac{1}{2}(\frac{x-\mu}{\sigma})^2} \quad -\infty < x < \infty$$

is the normal (gaussian) distribution
$\mu$=Mean of normal distribution (also known as paramter mean)
$\sigma$=Standard deviation of normal distribution (also known as paramter standard deviation)

$$\text{Define } Q(x) = \int_x^\infty N(0, 1; x) dx$$

We can show that $$\int_x^\infty N(\mu, \sigma; x) dx = Q\left(\frac{a-\mu}{\sigma}\right)$$

Also $Q^{-1}(x) = \alpha \rightarrow x = Q(\alpha)$ and is the inverse function of Q
Truncated Normal density function $N_T(\mu, \sigma; x)$ is given by $$N_T(\mu, \sigma; x) = t \frac{N(\mu, \sigma; x)}{Q\left(-\frac{\mu}{\sigma}\right)} + (1-t)\delta(x)x \geq 0$$

where $\delta(x)$ is the delta-dirac function
Revenue Calculation Routine: CALC_REV:
Let
v=Unit price of a product
$\theta$=Allocation of the product
Demand for product is distributed as truncated normal with parameters $\mu$ and $\sigma$. Then Expected Revenue =

$$\frac{v\sigma\left[h\left(\frac{\theta-\mu}{\sigma}\right) - h\left(-\frac{\mu}{\sigma}\right)\right]}{Q\left(-\frac{\mu}{\sigma}\right)} \quad \text{where } h(x) = xQ(x) = xQ(x) - \frac{e^{-\frac{x^2}{2}}}{\sqrt{2\pi}}$$

Some operations on truncated normal distribution will be needed, namely expected values to parameter values and vice-versa. Recall that normal distribution parameters are mean and standard deviation themselves. However when dealing with the truncated version of it, they no longer represent the actual mean and standard deviation (they are called expected mean and standard deviation instead). The mean and standard deviation of the original untruncated distribution remain as parameters for the truncated distribution (called parameter mean and parameter standard deviation instead). Both of them will be needed and require a transformation to move from one space to the other. In the process another parameter, t, (normalization parameter) is introduced (see the equations above). It will be assumed to be 1 by default. The reason it is needed is that when truncation is done there are various ways to do so. It can be assumed that all probability to the left of 0 in normal distribution becomes an impulse at 0 of strength prob$\{N(\mu, \sigma) \leq 0\}$ (t=prob$\{N(\mu, \sigma) \geq 0\}$) or the shape to the right is scaled so that is becomes a valid probability distribution (t=1).

Parameter values expected mean and standard deviation: PARM_TO_EXP:

Let
$\mu_d$=Expected Mean of $N_T(t, \mu, \sigma; x)$
$\sigma_d$=Expected Standard deviation of $N_T(t, \mu, \sigma; x)$ It can be proved that $$\mu_d = t\mu + \frac{\sigma t e^{-\frac{1}{2}(\frac{\mu}{\sigma})^2}}{\sqrt{2\pi} Q\left(-\frac{\mu}{\sigma}\right)}$$

$$\sigma_d^2 = t\sigma^2 - \mu_d(\mu_d - \mu)$$

Expected mean and standard deviation to parameter values: EXP_TO_PARM:

And given t, $\mu_d$ and $\sigma_d$, the following equations can be easily solved to determine the values of $\mu$ and $\sigma$, where a in the equations is $$\frac{\mu}{\sigma}.$$

$$t\left(1 + \frac{\sigma_d^2}{\mu_d^2}\right) = \frac{1}{h^2(\alpha)} + \frac{\alpha}{h(\alpha)}$$

$$\sigma = \frac{\mu_d}{th(\alpha)}$$

and thus $\mu = \sigma\alpha$ $$\text{where } h(x) = x + \frac{e^{-\frac{x^2}{2}}}{\sqrt{2\pi} Q(-x)}$$

Calculation of right hand probability:
CALC_PROB_TO_THE_RIGHT:
Truncated Normal density function $N_T(\mu, \sigma; x)$ is given by $$N_T(\mu, \sigma, x) = t \frac{N(\mu, \sigma, x)}{Q\left(-\frac{\mu}{\sigma}\right)} + (1-t)\delta(x)x \geq 0$$

where $\delta(x)$ is the delta-dirac function and $\mu$ and $\sigma$ are parameter mean and standard deviation respectively If X is a truncated normal random variable then $$G_x(\theta) = prob\{X \geq \theta\} = t \frac{Q\left(\frac{\theta-\mu}{\sigma}\right)}{Q\left(-\frac{\mu}{\sigma}\right)} + (1-t)\delta(\theta) = \frac{Q\left(\frac{\theta-\mu}{\sigma}\right)}{Q\left(-\frac{\mu}{\sigma}\right)} \text{ for } t = 1$$

Average mapped price of all products using a component= Average price of component: AVG_COMP_PR $$\text{Mapped price (on component } i \text{ for product } j) = v_j^{mapped} = v_j^* \frac{\lambda_i}{\sum_{l \in S_j^r} \lambda_l U_j^l}$$

$v_j$=Price of product j
$S_j^r$=Set of resources (components) used by product j
$U_j^l$=Usage of resource l by product j $$\text{Average component } (i) \text{ price} = v_i^{comp} = \frac{\sum_{j \in S_i^p} v_j^{mapped} \mu_j U_j^i}{\sum_{j \in S_i^p} \mu_j U_j^i}$$

$S_i^p$=Set of products using resource (component) i
Marginal value calculation: MARG_VALU:
Given an average component price $p_j^{avg}$ for a given component j, and supply level $\theta_j$ the new marginal value of the component is given by:

$$\lambda_J = p_j^{avg} G(\theta_j)$$

where
$G(\theta_j)$ is prob{Component j demand$\geq \theta_j$}
Note: Demands for products need to be mapped onto that of component taking into account the correlations between products when computing $G(\theta_j)$
Calculation of new mean and standard deviation of demand: ADD_DEMANDS:
Let X and Y be two random variables with means $\mu_X, \mu_Y$, and variances $\sigma_X^2, \sigma_Y^2$ respectively and correlation coefficient [X, Y].
Then $$\mu_Z = \mu_X + \mu_Y \quad (1)$$

$$\sigma_Z^2 = \sigma_X^2 + \sigma_Y^2 + 2[X,Y]\sigma_X\sigma_Y \quad (2)$$

Some Results on Compound Random Variables

In a compound random variable, each instance of N, denotes N products. Each product is made up of several components, where the amount of each component is a random variable itself. Usually there is a random variable of number of components associated with each of the N products and these are assumed to be independently and identically distributed (id). Let there be a random variable (RV) X representing number of requests (for whatever product) with a mean $\mu_X$ and standard deviation $\sigma_X$. Further let each request for each realization of X, say i, be composed of U components (whatever their identity), where U is a random variable with mean $\mu_U$ and standard deviation $\sigma_U$. There is an RV associated with each request within a realization of X. It will be assumed that all these RV's denoted by $U_X$ are id. It is easy to show that the mean $\mu_T$ and standard deviation $\sigma_T$ of the total number of components, the RV T, is given by:

Converting product demand to component demand: CONV_PROD_DEM_TO_COMP_DEM:

$$\mu_T = \mu_X \mu_U$$

$$\sigma_T^2 = \mu_X \sigma_U^2 + \sigma_X^2 \mu_U^2$$

If two random variables X and Y are correlated with correlation [X,Y] and are of the compound type X as above then the correlation between the resulting component demands (assuming they are using the same component albeit with different distributions), $T_1$ and $T_2$ is given by:
Transforming product correlation to component correlation: TRANSFORM_PROD_COR_TO_COMP_COR:

$$[T_1, T_2] = \frac{[X, Y]\sigma_X\sigma_Y\mu_{U_x}\mu_{U_y}}{\sqrt{(\mu_X\sigma_{U_x}^2 + \sigma_X^2\mu_{U_x}^2)(\mu_Y\sigma_{U_y}^2 + \sigma_Y^2\mu_{U_y}^2)}}$$

The overall algorithm is as follows:
iA_ALG:

1. Initialize the Marginal Values (MV) of all components to some non-zero values and set l=1 (where 1 is an index)
2. Set k=1 where k=component number, and perform the following steps for component k
3. Use procedure AVG_COMP_R to compute the average component price using the current MV's
4. Use CONV_PROD_DEM_TO_COMP_DEM to convert each product (using the component) demand into component demand
5. Using TRANSFORM_PROD_COR_TO_COMP_COR compute new correlation coefficients between various product-to-component mapped demands
6. Use ADD_DEMANDS to obtain the expected mean and standard deviation of the component demand using the correlation coefficients computed in the last step
7. Use EXP_TO_PARM to obtain parameter values corresponding to the expected component mean demand and standard deviation
8. MARG_VALU can now be used to compute the new marginal value for k
9. Set k=k+1. If k is less than the number of components go to step 3. If no more components left, check if the new set of marginal values has converged. If yes, stop and go to next step. Else set l=l+1 and go to step 2.
10. Use EXP_TO_PARM to compute revenue for each component and add them all up to obtain system revenue Solving OPT Now that an algorithm to solve SUBOPT exist OPT needs to be solved As mentioned earlier, standard methods exist to solve it once the gradient and the function value are known. It was shown how to obtain the two quantities in iA_ALG. Consider the case with no constraints on the supply vector. The problem becomes particularly simple now. OPT is repeated here without the definitions of the various symbols.
OPT:

$$\text{MAX } H(S, K) = R(S, K) - \sum_{i=1}^{M} W^i(S^i)$$

$S \in R^M, K \in J$
$S \geq 0$
$F_l \leq S \leq F_u$

Without any constraints, at the solution $$\frac{\partial H(S, K)}{\partial S^i} = \frac{\partial R(S)}{\partial S^i} - \frac{\partial W^i(S^i)}{\partial S^i} = 0, i = 1, 2, \ldots M$$

$$\Rightarrow \lambda_i = \frac{\partial W^i(S^i)}{\partial S^i} = C_i = \text{Per unit cost of component } i$$

In other words, it is not necessary to solve for the marginal values because they are known. MARG_VALU can be used to directly compute the individual supply vectors since each equation for each component is in terms of its supply vector embedded in the probability term. To be specific,
For component j compute average component cost, $p_j^{avg}$, using known MV's (corresponding component cost)

$$C_j = p_j^{avg} G(\theta_j) \Rightarrow \theta_j = \frac{C_j}{p_j^{avg}}$$

where
$G(\theta_j)$ is prob{Component j demand$\geq \theta_j$}
No iterations are required. But when there are constraints this may be a good starting point although it may be infeasible (many methods do not require a feasible starting point). But then again it may still be the solution if there are no binding constraints.

Figure 12:
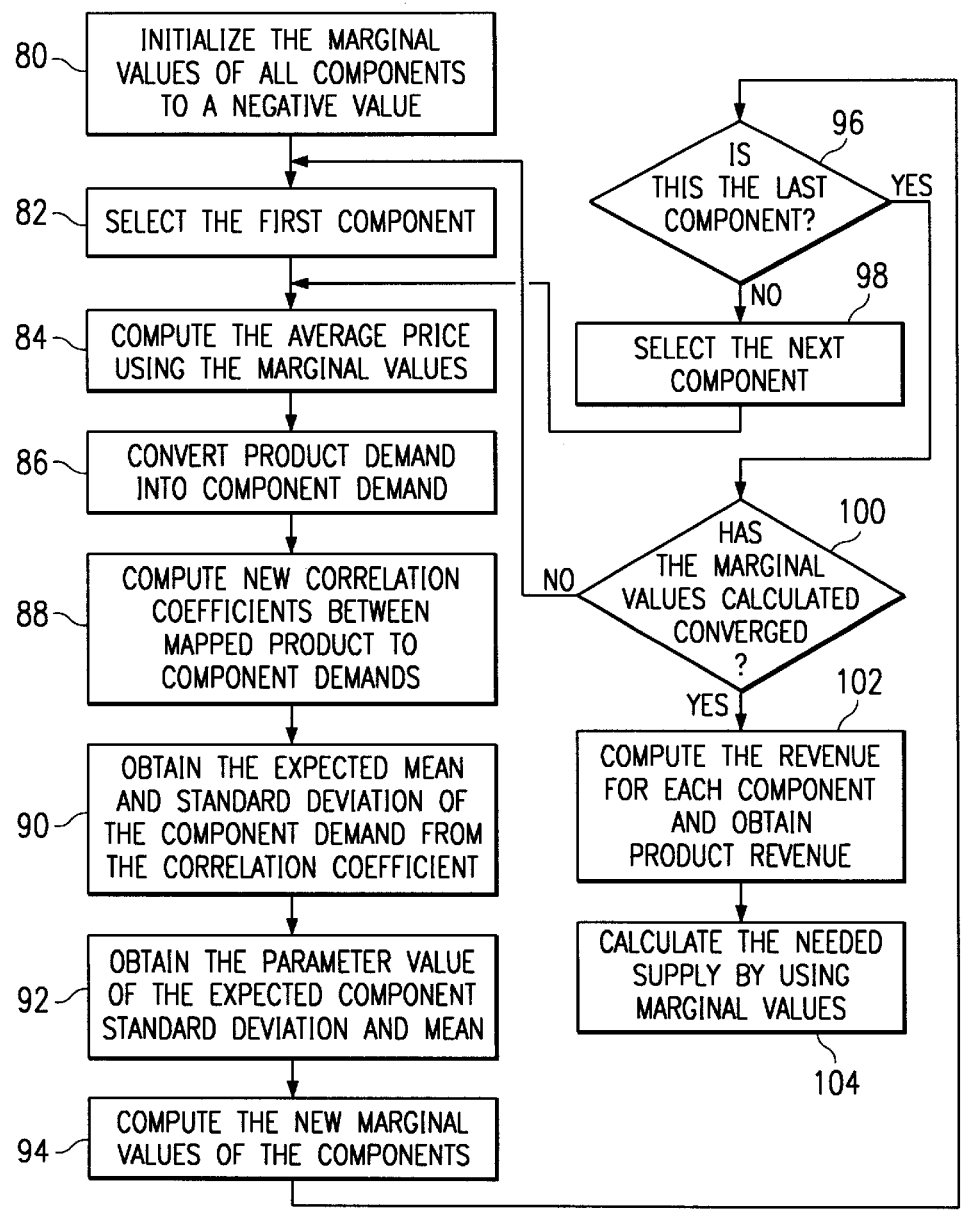

FIG. 12 is a flowchart illustrating the solving of subopt and opt over a single time period. In step 80, the marginal value of all components is set to a non zero value. Then, in step 82, the first component is selected. Next, the average component price is computed using the marginal value in step 84. The demand for each product using that component is converted into a component demand in step 86.

Then, in step 88, the correlation coefficient between the products demand and the component demand is computed. In step 90, the expected mean of the component demand and the expected standard deviation of the component demand is calculated. In step 92, the parameter values for the expected mean of the component demand and the expected standard deviation of the component demand is calculated. In step 94, a new marginal value set is calculated.

In step 96, it is determined if the component is the last component. If it is, step 100 is the next step. If not, the next component is selected at step 98 and execution of the method starts over at step 84. If, in step 96 it is determined that all components have been checked, in step 100 it is determined if the marginal values have converged. If so, then the revenue for each component can be calculated in step 102. In step 104, the needed supply is calculated from the marginal values. Considering step 100 again, if the marginal values have not converged then the process starts over at step 82. A limit can be set on the number of time convergence is checked.

Accounting for Service Levels, Expediting and Inventory Costs

Since the distributions at both the product as well as the component levels are known (assumed to be truncated normal), a service level requirement at any level can easily be incorporated as a lower level constraint on the supply vector. At the component level all that is needed is to simply look for a level of supply at which the probability that the demand exceeds the supply is less than (1−service-level).

If given at a product level, for each component the weighted mean (by expected demand) of service levels of all products is taken and used as a measure of component level then the earlier technique can be applied to this service level for a minimum component supply level.

At this point the expediting cost feature has not been implemented and would probably do so as part of a JDP. In the case where there is a hard constraint above which the expediting cost (increased) applies to a component, in iA_ALG also compute the expected expediting cost using the same procedure as in service level consideration. The probability of exceeding the component supply levels and thus the extra cost incurred can be figured. Thus a low value of supply will lead to higher expediting cost and low service levels (SL) and vice-versa. While the SL is handled through a lower limit on supply levels, expediting cost reduces the amount of revenue one would normally get by the increased cost due to expediting.

The inventory cost is easily handled as the cost of carrying excess key component from one time period to the next. The expected carry over is the expected excess computed similarly as the above quantities.

Multiple Time Period Case

As stated earlier, OPT is solved time period by time period. However, to account for carry over from one time period to the other, its costs and the fact that an excess produced is not necessarily sunk cost since it can be used in the next time period, some optimality conditions can be modified for each time period.

For any time period, let the optimal supply level for a key component be $\theta$. The demand distribution of the key component are known. So the expected left over for next period is given by:
<EL>=Expected Leftover
$f_x(x)$=Density function for random variable X, the component demand
$\theta$=Maximum Available supply of the component $$<EL> = \int_0^\theta (\theta - x) f_x(x) dx$$

If the demand is described by parameters $\mu$ and $\sigma$ as truncated normal (as assumed in the forumlation), then $$<EL> = \theta \left[ 1 - \frac{Q\left(\frac{\theta - \mu}{\sigma}\right)}{Q\left(-\frac{\mu}{\sigma}\right)} \right] + \frac{1}{Q\left(-\frac{\mu}{\sigma}\right)} [h(\theta) - h(0)]$$

Where $$h(x) = \mu Q\left(\frac{x - \mu}{\sigma}\right) + \frac{\sigma}{\sqrt{2\pi}} e^{\frac{(\frac{x-\mu}{\sigma})^2}{2}}$$

If the two optimals for successive time periods are $s_1$ and $s_2$, then the order quantity for period 2 is $s_2$−<EL>, where the leftover is from the first time period. Thus the carryover will mitigate the impact of end of life cycle effect in that in the next time period it will not be needed to order as much because it is know what to expect from some previous time period. However in other cases, in the first time period it may be too conservative not knowing that the leftover has some value in the next time period. That is the second period's optimality (order quantity) has visibility into the earlier time period but not the other way round. To complete the loop, the optimality condition is modified (or the gradient in the first time period) so that instead of subtracting just the unit cost of component (or its cost gradient if not linear) from the revenue gradient, the net value of the component in the next time period is added to it. The theory and procedure are:

Let
$O_n$=Ordered quantity of the component in time period (tp) n
$S_n$=Optimal supply level for tp n $R_{n-1}$=Optimal revenue for tp n−1
$R_n$=Optimal revenue for tp n
$M_{n-1}$=Margin (profit) for period n−1
$E_{n-1}$=Expected carryover from tp n−1 to n
$O_n = S_n - \alpha E_{n-1}$, $0 \leq \alpha \leq 1$
Then, at the optimal $$\frac{\partial M_{n-1}}{\partial S_{n-1}} = \frac{\partial R_{n-1}}{\partial S_{n-1}} - \left(\frac{\partial W_{n-1}}{\partial S_{n-1}} - (1 - \text{prob}\{\text{component demand} \geq S_{n-1}\}) * \right.$$
$$\left. \{\text{Value of component in } tp \ n\}\right)$$

Under truncated normality assumption $$\frac{\partial M_{n-1}}{\partial S_{n-1}} = \frac{\partial R_{n-1}}{\partial S_{n-1}} - \left(\frac{\partial W_{n-1}}{\partial S_{n-1}} - \left(1 - \frac{Q\left(\frac{S_{n-1}-\mu}{\sigma}\right)}{Q\left(-\frac{\mu}{\sigma}\right)}\right)\frac{\partial R_n}{\partial S_n}\right)$$

where $\frac{\partial W_{n-1}}{\partial S_{n-1}}$ = Derivative of component cost function in $tp \ n-1$ $V_n$ = Expected marginal value of leftover components in $tp \ n$ =

$$\left(1 - \frac{Q\left(\frac{S_{n-1}-\mu}{\sigma}\right)}{Q\left(-\frac{\mu}{\sigma}\right)}\right)\frac{\partial R_n}{\partial S_n} \therefore \frac{\partial M_{n-1}}{\partial S_{n-1}} = \frac{\partial R_{n-1}}{\partial S_{n-1}} - \frac{\partial W_{n-1}}{\partial S_{n-1}} + V_n$$

We may want to weight the value by a factor $\omega \leq 1$ so as to not rely 100% on future demands, thus making $$\frac{\partial M_{n-1}}{\partial S_{n-1}} = \frac{\partial R_{n-1}}{\partial S_{n-1}} - \frac{\partial W_{n-1}}{\partial S_{n-1}} + \omega V_n, \omega \leq 1 \Rightarrow \frac{\partial R_{n-1}}{\partial S_{n-1}} = \frac{\partial W_{n-1}}{\partial S_{n-1}} - \omega V_n$$

at optimality in the unconstrained case

By introducing the idea of assigning value to leftover components, the marginal cost of component seen in the current time period are effectively reduced The algorithm becomes:

MULT_TP_iA_ALG:

1. Set $\alpha$, the weighting factor for expected carryover and $\omega$, weighting factor for expected marginal value, to suitable values (algorithm parameters, typically determined experimentally)
2. Solve OPT (using the iA_ALG) for the last time period assuming some value for the leftover components. That gives $S_n$ and $V_n$
3. For the time period before, compute $S_{n-1}$ using $V_n$ (this also yields $V_{n-1}$) and repeat until n=1
4. Compute the expected leftover for tp 1 and set $O_2 = S_2$ − Expected Leftover from tp 1=Ordered quantity for tp 1. Repeat until obtain $O_n$ In step 2, the end of TP effects need to be considered. Normally to achieve steady-state one considers periods beyond the last one for which the plan is desired. This prevents the plans from fluctuating too much. By considering a few periods beyond the last one it may be determined how to mitigate the effect of not knowing the marginal value beyond the last (of the additional periods) period.

Although the present invention has been described in detail, it should be understood that various changes, substitutions, and alterations can be made hereto without departing from the spirit and scope of the invention as defined by the appended claims.

APPENDIX A

Expected Revenue for FCFS for Various AC's

| | ER (1) | AP | ER (2) | AP | ER (3) | AP |
|---|---|---|---|---|---|---|
| P (No PD) | .5*800 + .5*(.5*800 + .5*.5*800) = 700 | 700 | .5*800 + 400 + 200) + .5*(.5*800 + 400) + 200) = 1100 | 400 | .5*(800 + .5*(800 + 400) + 200) + .5*(.5*(800 + 400) + 200) = 1200 | 100 |
| P (PD) | .5*800 + .5*(.5*1100 + .5*(.5*1200)) = 825 | 825 | .5*(800 + 850) + .5*(.5*(1100 + 600) + .5(.5*1200)) = 1400 | 575 | .5*800 + .5*(1100 + 600) + 300) + .5*(.5*(1100 + 600) + 300) = 1550 | 150 |

APPENDIX B

Expected Revenue with PC for Various AC's

| Product/Value | AC = 1 | ER | AP | AC = 2 | ER | AP | AC = 3 | ER | AP | AC = 4 | ER | AP |
|---|---|---|---|---|---|---|---|---|---|---|---|---|
| PC 1200 | (1D)/.5*1200 = | 600 | | .5*1200 = | 600 | | .5*1200 = | 600 | | .5*1200 = | 600 | |
| PC 1100 | (1W)/.5*1100 + .5*600 | 850 | 850 | .5*(1100 + 600) + .5*600 = | 1150 | | .5*(1100 + 600) + .5*600 = | 1150 | | .5*(1100 + 600) + .5*600 = | 1150 | |
| PC 800 | (3W)/.5*800 + .5*850 = | 825 | | .5*(800 + 850) + | 1400 | 550 | .5*(800 + 1150) + .5*1150 = | 1550 | 150 | .5*(800 + 1150) + .5* | 1550 | 0 |

APPENDIX B-continued

Expected Revenue with PC for Various AC's

| Product/Value | AC = 1 | ER | AP | AC = 2 | ER | AP | AC = 3 | ER | AP | AC = 4 | ER | AP |
|---|---|---|---|---|---|---|---|---|---|---|---|---|
| | | | | .5* 1150 = | | | | | | 1150 = | | |

What is claimed is:

1. A computer implemented method for calculating a supply of a plurality of components for one or more products, comprising:
  repeating the following until a set of new marginal values converges:
    initializing a current marginal value for each component of the plurality of components;
    repeating the following for each component of the plurality of components:
      computing an average component price for a component according to the current marginal values;
      for each product associated with the component, converting a product demand for the product into a component demand for the component;
      computing a plurality of correlation coefficients according to the product demands and the component demands;
      obtaining an expected mean and an expected standard deviation of the component demand according to the correlation coefficients;
      obtaining a plurality of parameter values corresponding to the expected mean and the expected standard deviation of the component demand; and
      computing a new marginal value for the component according to the average component price and the parameter values; and
    calculating the supply of the components for the products according to the set of new marginal values.

2. The method of claim 1, wherein calculating the supply of the components for the products according to the set of new marginal values comprises dividing a cost of a component by an average component cost of the component, the cost of the component determined according to the new marginal value of the component.

3. The method of claim 1, further comprising utilizing a product control policy comprising a first come first served policy.

4. The method of claim 1, wherein the product demand is distributed according to a truncated normal distribution.

5. The method of claim 1, further comprising determining a final ordered quantity for a number of time periods by:
  calculating an optimal supply and a revenue for each time period, from a last time period to a first time period, in accordance with the set of new marginal values;
  repeating the following from the first time period to the last time period:
    computing an expected leftover for a current time period; and
    setting an ordered quantity of a next time period equal to the optimal supply of the next time period minus the expected leftover for the current time period; and
    determining the final ordered quantity in accordance with the ordered quantity of the last time period.

6. The method of claim 5, further comprising determining a cost of inventory by computing a cost of carrying excess components from a current time period to a next time period.

7. The method of claim 5, wherein the time periods have different durations.

8. A computer implemented method for determining a plurality of supplies for a plurality of components to order, comprising:
  determining the components for one or more products;
  selecting a marginal value of each component comprising a non-zero value;
  iteratively calculating the marginal values of the components until the marginal values converge; and
  computing the supplies to order in accordance with the marginal values.

9. The method of claim 8, further comprising computing the supplies to order by dividing a cost of a component by an average component cost of the component, the cost of the component determined according to the new marginal value of the component.

10. The method of claim 8, further comprising utilizing a product control policy comprising a first come first served policy.

11. The method of claim 8, wherein the product demand is distributed according to a truncated normal distribution.

12. The method of claim 8, wherein iteratively calculating the marginal values comprises:
  repeating the following, for each component, until a set of new marginal values converges:
    computing an average component price for a component according to a plurality of current marginal values;
    for each product associated with the component, converting a product demand for the product into a component demand for the component;
    computing a plurality of correlation coefficients according to the product demands and the component demands;
    obtaining an expected mean and an expected standard deviation of the component demand according to the correlation coefficients;
    obtaining a plurality of parameter values corresponding to the expected mean and the expected standard deviation of the component demand; and
    computing a new marginal value for the component according to the average component price and the parameter values.

13. The method of claim 8, wherein the products are manufactured under a make to order situation.

14. The method of claim 8, further comprising:
  calculating an optimal supply and a revenue for each time period of a sequence of time periods, from a last time period to a first time period; and
  repeating the following from the first time period to the last time period:
    computing an expected leftover for a current time period; and
    setting an ordered quantity of a next time period equal to the optimal supply of the next time period minus the expected leftover for the current time period.

15. The method of claim 14, further comprising determining a cost of inventory by calculating a cost of carrying excess components from a current time period to a next time period.

16. The method of claim 14, wherein the time periods have different durations.

17. A method for determining a plurality of marginal values for a plurality of components associated with one or more products, comprising:
   determining the components associated with the products;
   initializing a plurality of marginal values, each marginal value associated with a component; and
   repeating the following for each component of the plurality of components until the marginal values converge:
      calculating a price for a component according to a current marginal value;
      obtaining component demand information associated with the component; and
      computing a next marginal value in accordance with the price for the component and the component demand information associated with the component.

18. The method of claim 17, wherein obtaining component demand information associated with the component comprises:
   for each product associated with the component, converting a product demand for the product into a component demand for the component;
   computing a plurality of correlation coefficients according to the product demands and the component demands;
   obtaining an expected mean and an expected standard deviation of the component demand according to the correlation coefficients; and
   obtaining a plurality of parameter values corresponding to the expected mean and the expected standard deviation of the component demand in order to obtain component demand information associated with the component.

19. The method of claim 17, further comprising:
   calculating an optimal supply for each time period of a sequence of time periods, from a last time period to a first time period in accordance with the converged marginal values; and
   repeating the following from the first time period to the last time period:
      computing an expected leftover for a current time period; and
      setting an ordered quantity of a next time period equal to the optimal supply of the next time period minus the expected leftover for the current time period.

20. The method of claim 17, further comprising computing a supply associated with a component by:
   calculating a cost of the component according to the marginal value associated with the component; and
   computing a supply associated with the component according to the cost of the component and an average component cost of the component.

21. A system for determining a plurality of marginal values for a plurality of components associated with one or more products, comprising:
   a database operable to store data associated with the components and the products;
   one or more processors coupled to the database and collectively operable to:
      determine the components associated with the products;
      initialize a plurality of marginal values, each marginal value associated with a component; and
      repeat the following for each component of the plurality of components until the marginal values converge:
         calculating a price for a component according to a current marginal value;
         obtaining component demand information associated with the component; and
         computing a next marginal value in accordance with the price for the component and the component demand information associated with the component.

22. The system of claim 21, wherein the one or more processors are operable to obtain component demand information associated with the component by:
   for each product associated with the component, converting a product demand for the product into a component demand for the component;
   computing a plurality of correlation coefficients according to the product demands and the component demands;
   obtaining an expected mean and an expected standard deviation of the component demand according to the correlation coefficients; and
   obtaining a plurality of parameter values corresponding to the expected mean and the expected standard deviation of the component demand in order to obtain component demand information associated with the component.

23. The system of claim 21, wherein the one or more processors are operable to:
   calculate an optimal supply for each time period of a sequence of time periods, from a last time period to a first time period in accordance with the converged marginal values; and
   repeat the following from the first time period to the last time period:
      computing an expected leftover for a current time period; and
      setting an ordered quantity of a next time period equal to the optimal supply of the next time period minus the expected leftover for the current time period.

24. The system of claim 21, wherein the one or more processors are operable to compute a supply associated with a component by:
   calculating a cost of the component according to the marginal value associated with the component; and
   computing a supply associated with the component according to the cost of the component and an average component cost of the component.

25. Software for determining a plurality of marginal values for a plurality of components associated with one or more products, the software embodied in media and when executed operable to:
   determine the components associated with the products;
   initialize a plurality of marginal values, each marginal value associated with a component; and
   repeat the following for each component of the plurality of components until the marginal values converge:
      calculating a price for a component according to a current marginal value;
      obtaining component demand information associated with the component; and
      computing a next marginal value in accordance with the price for the component and the component demand information associated with the component.

26. The software of claim 25, operable to obtain component demand information associated with the component by:
   for each product associated with the component, converting a product demand for the product into a component demand for the component;

computing a plurality of correlation coefficients according to the product demands and the component demands;

obtaining an expected mean and an expected standard deviation of the component demand according to the correlation coefficients; and obtaining a plurality of parameter values corresponding to the expected mean and the expected standard deviation of the component demand in order to obtain component demand information associated with the component.

27. The software of claim 25, operable to:

calculate an optimal supply for each time period of a sequence of time periods, from a last time period to a first time period in accordance with the converged marginal values; and repeat the following from the first time period to the last time period:
  computing an expected leftover for a current time period; and
  setting an ordered quantity of a next time period equal to the optimal supply of the next time period minus the expected leftover for the current time period.

28. The software of claim 25, operable to compute a supply associated with a component by:

calculating a cost of the component according to the marginal value associated with the component; and computing a supply associated with the component according to the cost of the component and an average component cost of the component.

29. A system for determining a plurality of marginal values for a plurality of components associated with one or more products, comprising:

means for determining the components associated with the products;

means for initializing a plurality of marginal values, each marginal value associated with a component; and means for repeating the following for each component of the plurality of components until the marginal values converge:
  calculating a price for a component according to a current marginal value;
  obtaining component demand information associated with the component; and
  computing a next marginal value in accordance with the price for the component and the component demand information associated with the component.

30. A method for determining a plurality of marginal values for a plurality of components associated with one or more products, comprising:

determining the components associated with the products;

initializing a plurality of marginal values, each marginal value associated with a component; and repeating the following for each component of the plurality of components until the marginal values converge:
  calculating a price for a component according to a current marginal value;
  obtaining component demand information associated with the component, for each product associated with the component, converting a product demand for the product into a component demand for the component, computing a plurality of correlation coefficients according to the product demands and the component demands, obtaining an expected mean and an expected standard deviation of the component demand according to the correlation coefficients, and obtaining a plurality of parameter values corresponding to the expected mean and the expected standard deviation of the component demand in order to obtain component demand information associated with the component; and
  computing a next marginal value in accordance with the price for the component;

calculating an optimal supply for each time period of a sequence of time periods, from a last time period to a first time period in accordance with the converged marginal values; and repeating the following from the first time period to the last time period: computing an expected leftover for a current time period, and setting an ordered quantity of a next time period equal to the optimal supply of the next time period minus the expected leftover for the current time period; and computing a supply associated with a component by calculating a cost of the component according to the marginal value associated with the component, and computing a supply associated with the component according to the cost of the component and an average component cost of the component.

* * * * *